(12) United States Patent
Ellingson et al.

(10) Patent No.: US 9,722,803 B1
(45) Date of Patent: Aug. 1, 2017

(54) SYSTEMS AND METHODS FOR DEVICE AUTHENTICATION

(71) Applicant: InfoSci, LLC, Haymarket, VA (US)

(72) Inventors: John Ellingson, Haymarket, VA (US); Thomas Charles Ottoson, Lovettsville, VA (US)

(73) Assignee: InfoSci, LLC, Haymarket, VA (US)

( * ) Notice: Subject to any disclaimer, the term of this patent is extended or adjusted under 35 U.S.C. 154(b) by 0 days.

(21) Appl. No.: 15/395,336

(22) Filed: Dec. 30, 2016

Related U.S. Application Data

(60) Provisional application No. 62/393,438, filed on Sep. 12, 2016, provisional application No. 62/423,593, filed on Nov. 17, 2016.

(51) Int. Cl.
| | | |
|---|---|---|
| *H04L 9/32* | (2006.01) | |
| *H04W 12/06* | (2009.01) | |
| *H04L 29/06* | (2006.01) | |
| *H04W 12/04* | (2009.01) | |

(Continued)

(52) U.S. Cl.
CPC ............. *H04L 9/3268* (2013.01); *H04L 9/14* (2013.01); *H04L 9/30* (2013.01); *H04L 9/3247* (2013.01); *H04L 63/0272* (2013.01); *H04L 63/0428* (2013.01); *H04L 63/061* (2013.01); *H04L 63/0823* (2013.01); *H04L 63/1458* (2013.01);

(Continued)

(58) Field of Classification Search
CPC ............. H04L 63/0428; H04L 63/0272; H04L 63/1458; H04L 63/0823; H04L 63/061; H04L 9/3268; H04L 9/30; H04L 9/3247; H04L 2209/80; H04L 9/14; H04W 12/04; H04W 15/06
See application file for complete search history.

(56) References Cited

U.S. PATENT DOCUMENTS

| | | | | |
|---|---|---|---|---|
| 5,651,064 A | * | 7/1997 | Newell ................... | G06F 21/10 705/51 |
| 5,729,608 A | * | 3/1998 | Janson ................... | H04L 9/0827 380/30 |
| 6,055,637 A | | 4/2000 | Hudson et al. | |

(Continued)

OTHER PUBLICATIONS

Wang, Xiaofeng and Zheng, Nanning. "ID-Based Authenticated Multi-Party Key Agreement Protocol to Multimedia Applications Systems". 2008 International Conference on Computer Science and Software Engineering, IEEE, Dec. 2008.*

(Continued)

*Primary Examiner* — Darren B Schwartz
(74) *Attorney, Agent, or Firm* — The Marbury Law Group, PLLC

(57) ABSTRACT

Embodiments include methods, and systems and computing devices configured to implement the methods of authenticating a computing device. A processor of a first computing device may obtain a transitory identity and may send the transitory identity to a second computing device and a third computing device. A processor of the second computing device may send the transitory identity to the third computing device with a request to authenticate the first computing device. The processor of the third computing device may authenticate the identity of the first computing device in response to determining that the transitory identity received from the first computing device matches the transitory identity received from the second computing device.

37 Claims, 21 Drawing Sheets

(51) Int. Cl.
*H04L 9/30* (2006.01)
*H04L 9/14* (2006.01)
(52) U.S. Cl.
CPC ........... *H04W 12/04* (2013.01); *H04W 12/06* (2013.01); *H04L 2209/80* (2013.01)

(56) References Cited

U.S. PATENT DOCUMENTS

| | | | | |
|---|---|---|---|---|
| 8,321,670 | B2 | 11/2012 | Lior et al. | |
| 8,817,985 | B2* | 8/2014 | Fukuda | H04L 9/083 380/255 |
| 2002/0138761 | A1* | 9/2002 | Kanemaki | G06F 21/33 726/7 |
| 2004/0131187 | A1* | 7/2004 | Takao | H04L 63/0428 380/255 |
| 2005/0187966 | A1* | 8/2005 | Iino | H04L 63/065 |
| 2005/0216769 | A1* | 9/2005 | Matsuoka | H04L 63/0823 726/5 |
| 2006/0087999 | A1* | 4/2006 | Gustave | H04L 63/0853 370/328 |
| 2006/0133613 | A1* | 6/2006 | Ando | H04L 9/0844 380/270 |
| 2007/0186115 | A1 | 8/2007 | Gao et al. | |
| 2008/0022091 | A1* | 1/2008 | Deshpande | H04L 63/0428 713/157 |
| 2008/0086646 | A1* | 4/2008 | Pizano | H04L 9/3231 713/189 |
| 2008/0209214 | A1* | 8/2008 | Schrijen | H04L 9/083 713/169 |
| 2008/0235768 | A1* | 9/2008 | Walter | H04L 63/08 726/3 |
| 2008/0313698 | A1* | 12/2008 | Zhao | H04L 63/08 726/1 |
| 2008/0313723 | A1* | 12/2008 | Naono | H04L 9/321 726/7 |
| 2009/0199009 | A1* | 8/2009 | Chia | H04L 63/0281 713/176 |
| 2009/0282467 | A1* | 11/2009 | Schenk | H04L 63/10 726/7 |
| 2009/0287921 | A1* | 11/2009 | Zhu | G06Q 10/02 713/155 |
| 2010/0042833 | A1* | 2/2010 | Platt | G06F 21/6254 713/168 |
| 2010/0228981 | A1* | 9/2010 | Yao | H04L 63/062 713/171 |
| 2010/0250952 | A1* | 9/2010 | Pang | H04L 9/0847 713/176 |
| 2010/0279611 | A1* | 11/2010 | Kumazawa | H04L 9/32 455/41.2 |
| 2011/0154037 | A1* | 6/2011 | Orre | H04L 63/061 713/168 |
| 2011/0197064 | A1* | 8/2011 | Garcia Morchon | H04L 63/061 713/168 |
| 2012/0167169 | A1* | 6/2012 | Ge | H04L 9/3271 726/2 |
| 2013/0035067 | A1* | 2/2013 | Zhang | H04L 63/08 455/411 |
| 2013/0182848 | A1* | 7/2013 | Sundaram | H04L 9/0833 380/277 |
| 2013/0232551 | A1* | 9/2013 | Du | H04L 9/3255 726/3 |
| 2013/0276092 | A1 | 10/2013 | Sun et al. | |
| 2014/0162601 | A1* | 6/2014 | Kim | H04W 12/06 455/411 |
| 2015/0106898 | A1* | 4/2015 | Du | H04L 9/321 726/7 |
| 2015/0220726 | A1* | 8/2015 | Huo | G06F 21/44 726/29 |
| 2015/0222632 | A1* | 8/2015 | Ichijo | H04L 63/0876 726/7 |
| 2015/0237026 | A1* | 8/2015 | Kumar | H04L 63/08 726/28 |
| 2015/0281199 | A1* | 10/2015 | Sharma | H04L 63/08 713/168 |
| 2016/0063466 | A1 | 3/2016 | Sheridan et al. | |
| 2016/0099922 | A1* | 4/2016 | Dover | H04L 63/061 713/171 |

OTHER PUBLICATIONS

Cremers, C.J.F. and Mauw, S. "A Family of Multi-Party Authentication Protocols". Eindhoven University of Technology, 2006.*
RSA, "Global Security Chiefs Offer Five Recommendations to Overhaul Outdated Information Security Processes", http://www.rsa.com/en-us/company/newsroom/global-security-chiefs-offer-five-recommendations-to-overhaul, pp. 1-11, (Dec. 10, 2013).
DBIR "2016 Data Breach Investigations Report—89% of breaches had a financial or espionage motive", Verizon 2016 Data Breach Investigations Report. p. 1-85, (2016).
Grass, et al., "Draft NIST Special Publication 800-63B Digital Authentication Guideline, Authentication and Lifecycle Management", National Institute of Standards and Technology, U.S. Department of Commerce, pp. 1-48, (Nov. 18, 2016).
Wikipedia, "Man-in-the-middle attack", https://en.wikipedia.org/w/index.php?title=Man-in-the-middle_attack&oldid=753645601; 5 pages, (Dec. 8, 2016).
Pansa, et al., "Web Security Improving by using Dynamic Password Authentication", 2011 International Conference on Network and Electronics Engineering, pp. 32-36, (2011).
Amyx, "Managed PKI certificates: One step at a time toward securing the IoT", Unshackle the Internet of Things; TechBeacon: 14 pages, (2016).
Commission on Enhancing National Cybersecurity, "Report on Securing and Growing the Digital Economy", 100 pages, (Dec. 1, 2016).
Wikipedia, "Dynamic SSL", https://en.wikipedia.org/wiki/Dynamic_SSL, Dynamic SSL—Wikipedia, the free encyclopedia, pp. 14, (Aug. 25, 2016).
Glover, "PCI 3.1: Stop Using SSL and Outdated TLS Immediately", http://blog.securitymetrics.com/2015/04/pci-3-1-ssl-and-tls.html; pp. 1-6, (Aug. 25, 2016).
Dierks, "The Transport Layer Security (TLS) Protocol Version 1.1", Network Working Group, https://tools.ietf.org/html/rfc4346?cm_mc_uid=55413578387314706858380&cm_mc_sid_50200000=1472153170, pp. 1-174, (Apr. 2006).
IBM "The Secure Sockets Layer and Transport Layer Security", Verification of X.509 Public Key Certificates for Secure Communications, http://www.ibm.com/developerworks/library/ws-ssl-security, pp. 1-48, (Jun. 6, 2012).
RSA, "Two-Factor Authentication Is a Must for Mobile", https://blogs.rsa.com/two-factor-authentication-is-a-must-for-mobile, www.rsa.com, pp. 1-7, (Aug. 24, 2016).
Jarmoc, "Transitive Trust and SSL/TLS Interception Proxies, SecureWorks", https:www.secureworks.com/research/transitive-trust, pp. 1-21, (Mar. 21, 2012).
Bocek, "Attack on Trust Threat Bulletin: Sony Breach Leaks Private Keys, Leaving Door Open", Venafi Blog, http://www.venafi.com/blog/attack-on-trust-threat-bulletin-sony-breach-leaks, 7 pages, (Jan. 19, 2017).
Cisco, "Dynamic Shared Secrets for the Cisco CMTS Routers", Cisco IOS CMTS Software Configuration Guide, 32 pages, (Feb. 14, 2008).
Juniper Networks, Inc., "Enabling IMS AAA Dynamic Authorization", 5 pages, (1999-2010).
Kwong, et al., "On the Feasibility and Efficacy of Protection Routing in IP Networks", University of Pennsylvania Scholarly Commons, Department of Electrical & Systems Engineering, 11 pages, (Dec. 10, 2009).
IBM Knowledge Center, "RSCS Dynamic Authorization Server Virtual Machine", 2 pages.
Stack Exchange, "What can an attacker do with a stolen SSL private key? What should the web admin do?", Information Security Stack Exchange, 2 pages, (Jan. 19, 2017).

(56) References Cited

OTHER PUBLICATIONS

Cnodder, et al., "Radius Dynamic Authorization Server MIB", Network Working Group, Request for Comments; 4673, 25 pages, (Sep. 2006).

Chiba, et al., "Dynamic Authorization Extensions to Remote Authentication Dial in User Service (RADIUS)" Network Working Group, Request for Comments: 5176, 35 pages, (Jan. 2008).

* cited by examiner

SYSTEMS AND METHODS FOR DEVICE AUTHENTICATION

This application claims the benefit of priority to U.S. Provisional Application No. 62/423,593 filed on Nov. 17, 2016 and U.S. Provisional Application No. 62/393,438, flied Sep. 12, 2016, the entire contents of both of which are incorporated herein by reference.

BACKGROUND

The concept of shared secrets and the concomitant trust have been the core of the security paradigm since before the fall of Troy. Historically, the shared secret was a password that two parties could use to identify each other as a measure of trust. While these shared secrets might change from time to time, they were durable enough to last from the time they were shared until they were used. The passwords only functioned as long as they were kept secret. The parties that shared the secrets were typically known to each other in some way or otherwise vouched for. The use of the challenge and response password enabled trusted parties to be identified in the dark or through the use of a trusted, shared secret. Trust could be conferred to another person by the authorized sharing of the secret.

More recently, the development of a digital environment has enabled a vast expansion in rapid communication and information transactions, among other things. The old paradigm of the shared secret has been incorporated into the digital environment in numerous ways—from usernames and passwords, to secure communications between users and systems. For example, this concept is foundational to the Secure Socket Layer and Certificate Authority information security infrastructure.

However, the digital environment is one in which secrets are difficult to keep beyond a short period of time, and once secrecy is lost the formerly secret information may be proliferated rapidly and with complete fidelity. The digital environment is also one in which shared secrets have become target of "hacking" that has transformed many "secrets" (e.g., passwords, digital certificates, private information and other types of authentication data) into a commodity freely traded on the gray and black markets, destroying the benefit of such secrets for securing digital exchanges. Yet, the underlying security mechanism of the digital environment depends upon the operational, but now often false, assumption that the secret is still secret. The new dynamic of the failure of the shared secret paradigm and the trust dependent upon it requires a radical change in operating assumptions.

SUMMARY

Various embodiments include methods of authenticating interactions between a first computing device and a second computing device with support of a third computing device. Various embodiments may include obtaining a first transitory identity at the first computing device, sending the first transitory identity to the second computing device and to the third computing device, receiving in the second computing device the first transitory identity from the first computing device, obtaining a second transitory identity at the second computing device, sending the second transitory identity from the second computing device to the first computing device and to the third computing device, receiving in the first computing device the second transitory identity from the second computing device, sending an authentication query including the second transitory identity from the first computing device to the third computing device, sending an authentication query including the first transitory identity from the second computing to the third computing device, receiving in the third computing device the first transitory identity from the first computing device, receiving in the third computing device from the second computing device the authentication query comprising the first transitory identity, determining in the third computing device whether the first transitory identity from the second computing device matches the first transitory identity from the first computing device, sending by the third computing device to the second computing device an indication of whether the first computing device is authenticated based on the determination of whether the first transitory identity from the second computing device matches the first transitory identity from the first computing device, receiving in the third computing device the second transitory identity from the second computing device, receiving in the third computing device an authentication query comprising the second transitory identity from the first computing device, determining by the third computing device whether the second transitory identity from the first computing device matches the second transitory identity from the second computing device, sending by the third computing device to the first computing device an indication of whether the second computing device is authenticated based on the determination of whether the second transitory identity from the first computing device matches the second transitory identity from the second computing device, receiving in the first computing device from the third computing device an indication of whether the second computing device is authenticated, and receiving in the second computing device from the third computing device an indication of whether the first computing device is authenticated.

Various embodiments further include computing devices configured with processor-executable instructions to perform operations of the method summarized above. Various embodiments further include a system including a first computing device, a second computing device, and a third computing device all configured to perform operations of the method summarized above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.\

DETAILED DESCRIPTION

Figure 1A:
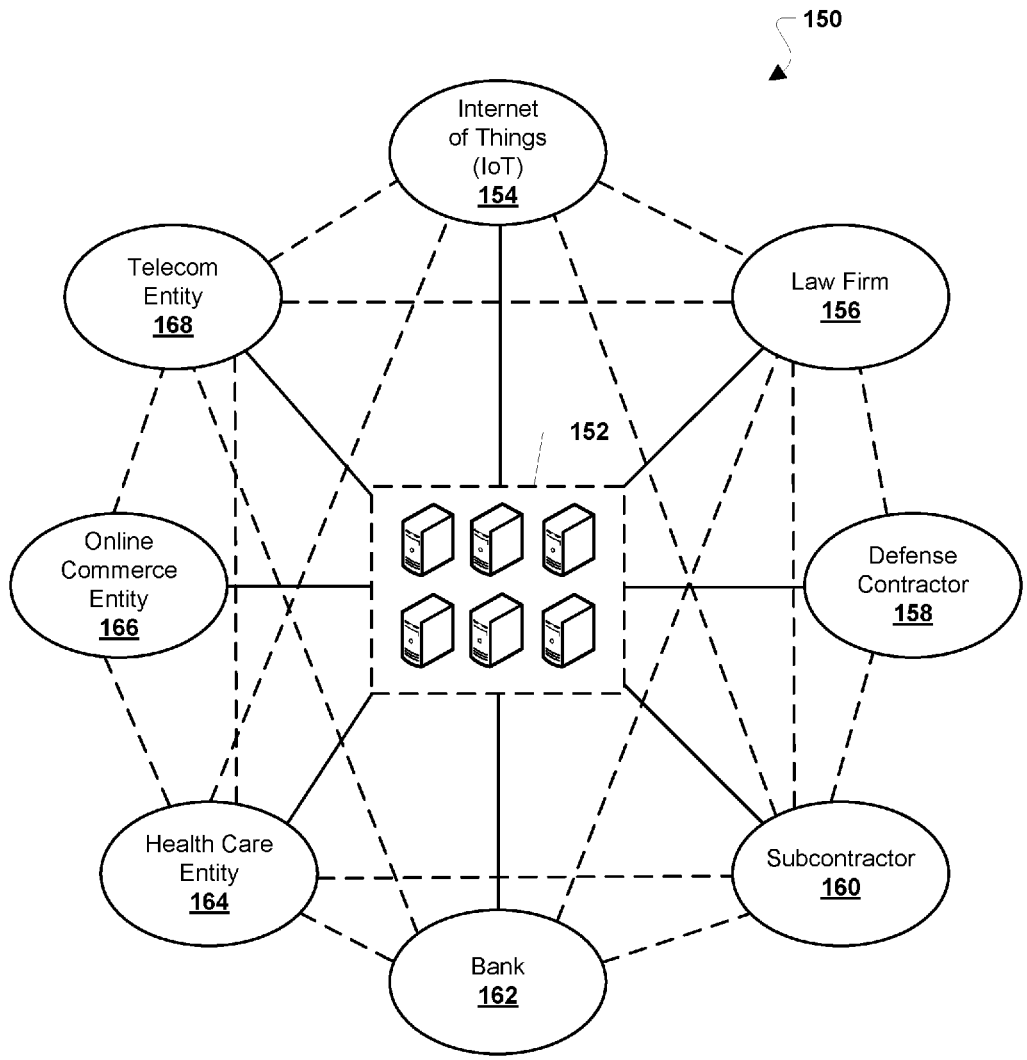
FIGS. 1A-1C are component block diagrams of a communication system suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide methods, and computing devices (or other digital or programmable devices) configured to implement the methods, that enable authenticating of a computing device to other computing devices in a communication system based on dynamic information of a computing device that does not rely on the paradigm of shared secrets and static information. Because the transitory identity of each computing device is periodically or aperiodically changing, and each computing device is in periodic or aperiodic communication with other computing devices (synchronously or asynchronously) sending and/or receiving new transitory identities, various embodiments improve the function of any communication network or any electronic communication system by improving the security of communications. Various embodiments also improve the function of any communication network by reliably authenticating the identity of a participating computing device without relying on static identification information, such as a shared secret, that may be vulnerable to attack by access and/or copying.

The term "computing device" refers to any programmable computer or processor that can be configured with programmable instructions to perform various embodiment methods. A computing device may include one or all of personal computers, laptop computers, tablet computers, cellular telephones, smartphones, Internet enabled cellular telephones, Wi-Fi enabled electronic devices, personal data assistants (PDAs), wearable computing devices (including smart watches, necklaces, medallions, and any computing device configured to be worn, attached to a wearable item, or embedded in a wearable item), wireless accessory devices, wireless peripheral devices, Internet of Things (IoT) devices, network elements such as servers, routers, gateways, and the like (including so-called "cloud" computing devices), and similar electronic devices equipped with a short-range radio (e.g., a Bluetooth, Peanut, ZigBee, and/or Wi-Fi radio, etc.) and/or a wide area network connection (e.g., using one or more cellular radio access technologies to communicate using a wireless wide area network transceiver, or a wired connection to a communication network).

As used herein, the term "information transaction" refers to any communication or other exchange of information in which the identity of the participating devices may be authenticated. In some embodiments, the methods and computing devices configured to implement the methods described herein may be implemented in a variety of contexts in which the identity of the participating devices may be authenticated, such as health care record management, secure communications (e.g., government, business, intelligence community, etc.), public records management systems, voting systems, financial services systems, security brokerage systems, and many others. In some embodiments, the methods and computing devices configured to implement the methods described herein may be implemented in IoT devices, or among IoT devices and an IoT device controller, such as a router, server, IoT hub, or another similar device. In particular, various embodiments, when implemented in an IoT environment, may be of particular use in preventing distributed denial of service (DDoS) attacks, without human intervention. In some embodiments, the methods and computing devices configured to implement the methods described herein may authenticate the participation of a computing device in an information transaction. In some embodiments, the methods and computing devices configured to implement the methods described herein may be implemented in the context of a commercial transaction, to enable performance of a non-repudiable commercial transaction in which, because the participation of specific computing devices may be authenticated, a participant may be unable to later deny participation in the transaction (such as, for example, a card-not-present financial transaction).

The terms "component," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device itself may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The digital environment enables rapid communication and information transactions on up to a global scale, among other things. However, the current digital environment rests on a shaky security foundation: the old paradigm of the static shared secret. There are numerous fundamental differences between the purely human environment we operated in for thousands of years and the digital environment we operate in today.

Fifty years ago, commerce and communication was frequently face-to-face, local and between parties who knew each other. Today, commerce and communication is remote, global and between parties who not only do not know each other, but will probably never meet—i.e., the digital environment is typically anonymous and remote, rather than local and familiar. Further, many modern digital communications are between computing devices acting independently of any human interactions or knowledge. Face-to-face transactions naturally include an authentication step; visual recognition of the other party. By enabling transactions between total strangers completely unknown to and remote from each other, the transition from the analog environment involving interactions among known parties to the digital environment incorporated a vulnerability that is inherent, though often unrecognized, that authentication of the parties involves computer-mediated methods which can be compromised.

Further, the digital environment is one in which secrets are difficult to keep beyond a short period of time. Once secrecy is lost the formerly secret information may be proliferated rapidly and with complete fidelity. Breakdowns in digital system security, resulting in massive data breaches, have become nearly commonplace and the frequency of their occurrence has accelerated.

In the majority of the breach incidents, a violation of trust or the misuse of a shared secret (e.g., a credential) is at the root of the failure of security. While in certain cases a particular security failure may be due to a lack of strength in the technology employed to provide the trust and security, in general security failures in the digital environment have occurred in a wide variety of industries using a variety of technology deployments. Security failures occur across the board and are attributable not only to any particular deployed technology, but also to the practices and procedures inherent to its application and use. Thus, security failures in the digital environment are due to something more fundamental and endemic in the root strategy of the trust paradigm of the shared secret that has failed.

The current paradigm of digital security fails for at least three fundamental reasons: (1) the current paradigm is based on trust, and trust is what fails; (2) the current paradigm is based on stable or static shared secrets, but the secrets do not remain secret; and (3) the vast majority of information transactions are between anonymous parties. Thus, "trusted systems" ultimately do not work because they are penetrable and vulnerable. Moreover, current "trusted systems" are vulnerable to penetration and exploitation in large part due to the use of static or durable information that does not vary with time (or duration).

For example, the current digital security paradigm relies on a certificate authority or similar entity that issues a static digital certificate (or another similar datum). The digital certificate may certify ownership of a public key by a named subject of the certificate, ostensibly enabling other parties to rely on signatures or assertions made about the private key that corresponds to the certified public key. One example of this security paradigm is Secured Socket Layers (SSL), a security protocol widely used to secure communications between computing devices, e.g., between a web browser one a computing device and a remote web server. SSL employs a cryptographic system that uses a public key and a private key to encrypt information sent between a computing device and a website. The core of SSL security relies on certificates are provided by a certificate authority, which are installed on a company's server once the company is validated by the certificate authority. In this model of trust relationships, the certificate authority is a third party that is trusted by both the owner of the certificate and the other party relying on the certificate.

Major weaknesses in this security paradigm include the certificate and the certificate authority. If the certificate on a computing device is compromised, then security of communications from/to that computing device is lost. If the certificate authority is compromised, then the security of the entire system is lost, potentially subverting all of the entities that trust the compromise certificate authority. An attacker who gains access to the certificates from the compromised certificate authority may then impersonate any trusted user represented by the certificate authority. Thus, the use of static certificates creates the potential for a catastrophic security breach.

As another example, many individual devices may attempt to login to a service or system using the same credentials regardless of how the credentials are obtained, but only one device or system can legitimately authenticate the login—the legitimate holder of the credential. There have been numerous strategies to take advantage of this principle, but all fail because they share a common vulnerability—the authentication step is based on information that can be stolen and used by the attacker. Typically, login credentials consist of a username and a password. While numerous means exist for securing login credentials that make the credentials more complicated, such as one-time use and multifactor uses, all of the use methods of obfuscating or making login credentials more complex are ultimately vulnerable if the digital infrastructure itself is vulnerable. The very existence and use of multifactor authentication steps and multifactor authentication paths are admissions that user name-password combinations are inadequate to the task of providing security.

Various embodiments disclosed in this application address the security vulnerability of digital systems and provide electronic security for device-to-device communication as well as for enhanced user authentication. Various embodiments provide computer-implemented methods to provide for continuous refreshing and changing of digital certificates. Various embodiments incorporate the assumption that trusted systems ultimately are demonstrably insecure, because such systems are penetrable and vulnerable. Various embodiments provide a digital communication system that assumes no trust among various network elements, for at least the reason that the digital environment is inherently untrustworthy.

Various embodiments change the way devices are authenticated on networks by generating and sharing authenticating information of such limited duration that it cannot be effectively used by an attacker. In various embodiments, the duration during which the authenticating information may be used may be relatively short, such as a duration of minutes. This contrast with the effective duration of certificates from a conventional certifying authority (CA), which may have a duration of up to decades in some cases. In some embodiments, the duration of the authenticating information may be determined to be shorter than the time it takes an attacker to obtain and exploit the information. Various embodiments are based on the assumption that the authenticating information is potentially vulnerable and may be obtained by an attacker, and the validity duration of the authenticating information may be determined such that its usefulness for authentication expires before an adversary can discover and exploit it. For example, based on state of the art computing capabilities, an amount of time required to decrypt a commonly used encryption hash (e.g., SHA256) using brute force may be determined. In various embodiments, the validity duration of authentication information may change as advancements in computing technologies reduce the time required to discover and decrypt such information. In some embodiments, the system may determine a validity duration for authenticating information that is shorter than the determined time required to decrypt the encrypted information.

The relatively short useful duration of the authenticating information reduces by orders of magnitude the possibility of such authenticating information being guessed, accessed or "hacked" and then used as a means of attacking the system. Using such authenticating information enables the system to authorize only desired devices and to deny access to unauthorized devices, even when such unauthorized devices present previously-acceptable username and passwords, certificates or other access credentials. Thus, various embodiments further enable existing security technologies and components to preclude access to a device or system system by attackers who have obtained perfect copies of legitimate user login credentials. Various embodiments may be applied in other security applications utilizing one-time passwords, such as cloud security, as well as on a wide range of devices, including Internet of Things (IoT) devices. Various embodiments may be applied to authenticate communications among a variety of devices, such as computing devices that may be targets of attack or subordination for recruitment in the performance of a distributed denial of service (DDoS) attack.

In various embodiments, computing devices perform a bi-directional, three-way authentication in which each computing device periodically (or aperiodically) generates an ephemeral "transitory identity" using dynamic and/or static state aspects (alone or in combination) of the computing device. The transitory identities generated by each computing device may be exchanged and authenticated by two (or more) other computing devices. Transitory identities may be used with existing security methodologies, including hashing techniques, updated keystones, updated Trust Anchors, Client Certificate Mapping, Active Directory, Internet Information Services (IIS) Client Certificate Mapping, digital certificates, a trusted third-party, and other security mechanisms. Various embodiments may defeat attempts to impersonate an authorized computing device, such as an attempt to login to a computer network or online environment by an unauthorized user possessing the credentials of an authorized user. Various embodiments may also provide secure communications between digital devices of any kind on any network. Thus, various embodiments may provide secure, creditable and authenticated communication between computing devices on a communication network that eliminates the common vulnerabilities of conventional authentication technologies.

In various embodiments, a transitory identity may be generated dynamically, such as based at least in part on one or more changing or dynamic states of the computing device that generates the transitory identity, or dynamic information obtained by a sensor within the computing device (e.g., a camera, microphone, accelerometer, etc.). In some embodiments, a computing device may generate its own transitory identity. In some embodiments, another computing device, such as an authentication server, may generate the transitory identity for the computing device, and the transitory identify may be pushed to the computing device, or pulled from the server by the computing device.

In some embodiments, a given transitory identity may be used only once. In such embodiments, a transitory identity that has been used may thereafter be unusable.

In various embodiments, time is a critical element of transitory identities. For example, the expiration of a transitory identity may be limited to a reasonable length of time that a secret can be expected to be kept. In various embodiments, the computing device may determine a time bound or time duration of a transitory identity such that the transitory identity is useful for a length of time that is shorter than a time required for an attacker to guess or acquire the transitory identity and use it in a successful attack, such as access to a secure network or completion of a secured transaction. Beyond the time bound or time duration, the transitory identity may be unusable for authentication of any computing device. The duration of a transitory identity may be shorter than the duration of a given communication session (e.g., a VPN session or an Internet shopping and purchase session). In such situations, a new transitory identity may be generated for the computing device during the communication session and used in securing data exchanges within the communication session after expiration of the old transitory identity.

In some embodiments, the dynamic aspects of the generating computing device used in generating transitory identities will change frequently or continuously so that each transitory identity is based on different (i.e., changed) data. In such embodiments, each generated transitory identity may include unique data (that may be represented by a string of data) that represents a "snapshot" of a dynamic state of the generating computing device at the time that the transitory identity is generated. Various embodiments use the unique data (or unique data string) generated by reference to one or more constantly changing conditions as a basis for generating a unique dynamic certificate. As a result, it is not possible for an attacker to discover the basis for generating transitory identities in an attempt to generate counterfeit identities.

In some embodiments, computing devices may exchange information or otherwise negotiate a timing of when each computing device may generate a new transitory identity. In some embodiments, a computing device (e.g., a server) may instruct another computing device (e.g., a user device) to generate a new transitory identity. Such coordination of generating new transitory identities may enable frequent changes in transitory identities during an extended digital communication session.

In some embodiments, a computing device may include a module, such as a transitory identity module, that may store a small unit of static information. The information may include text, an image, biometric information, and the like. In some embodiments, a computing device may combine dynamic information with the static information to generate the transitory identity. By adding dynamic information to static information, an entire string information may be changed by altering a small element. Further, a hash of the combined dynamic information and static information may be different from a hash of the static information alone, without requiring alteration of the entire data set.

In some embodiments, each computing device participating in a communication system may generate a transitory identity. Each participating communication device may send its generated transitory identity to an authentication server, which may function as a repository of the real-time generated transitory identities. For example, the first computing device and a second computing device may each generate transitory identities, and may send the generated transitory identities to each other and to the authentication server. In some embodiments, the first computing device may send a query to the authentication server that includes the transitory identity that the first computing device received from the second computing device, requesting that the authentication server authenticate the transitory identity of the second computing device. The third computing device may compare the second computing device's transitory identities received from both the second computing device and the first computing device. In response to determining that the transitory identities match, the third computing device may send to the first computing device an indication of authentication success of the second computing device. In some embodiments, the indication of authentication success may be transmitted by the third computing device using methods configured to defeat man-in-the-middle attacks. In various embodiments, the third computing device may function as a repository in a variety of applications, including, but not limited to financial services systems, security brokerage systems, healthcare record management systems, secure communication systems for business, government, intelligence community, etc., public records systems (e.g., firearm registries, Departments of Motor Vehicles, etc.), voting systems, and among Internet of Things devices.

In response to determining that the transitory identities do not match, the third computing device may send to the first computing device an indication of authentication failure of the second computing device. In some embodiments, the indication of authentication failure may be transmitted by the third computing device using methods configured to defeat man-in-the-middle attacks.

In some embodiments, the authentication server may also generate a transitory identity and send the third computing device transitory identity to the first and second computing devices, and the first and second computing devices may compare the third computing device transitory identity and authenticate for themselves the identity of the third computing device.

In some embodiments, the third computing device, together with its transitory identity or separate from its transitory identity, may send an instruction to other computing devices (e.g., the first and second computing devices) to generate a new transitory identity. In various embodiments, each computing device participating in the communication system may periodically or aperiodically generate a new transitory identity. During an ongoing communication session, such new transitory identities may be generated sufficiently before the expiration of one or more current transitory identities securing the communication session to enable the two computing devices and the third computing device to complete the exchanges and authentications of the new transitory identities so that the communication session can continue uninterrupted and secured by the new identities. In some embodiments, each new transitory identity may be set for single use, such that each computing device that receives a transitory identity from another computing device may only use (interact with, authenticate, process, hash, etc.) a transitory identity once, after which the received transitory identity becomes unusable. Again, a lifetime may be set for each new transitory identity for a time duration that is less than a period of time in which an attacker may obtain and use the transitory identity.

Various embodiments may operate to quickly reconstitute security after a successful attack. In various embodiments, a successful attack on the authentication server or another device participating in the system will not compromise system security for any significant period of time, since any exfiltrated credential information is of no lasting value to the attacker, as it will all expire before it can be exploited. Thus, the authentication system may not be compromised by attacking the authentication server. Various embodiments provide a communication system that is durable and sustainable and that operates successfully in an environment in which any and every component is likely to be successfully attacked and compromised.

In some embodiments, a first computing device and a second computing device may establish a trusted relationship based on a previously-shared data hash (e.g., using a hashing algorithm such as MD5, SHA1, or SHA2). The previously-shared data hash may be created, for example, from a stored and shared time-based one-time password algorithm (e.g., Internet Engineering Task Force RFC 6238, Temporary One-Time Password (TOTP), etc.). Such a previously-shared data hash may be stored in memory on the first computing device and/or the second computing device. In some embodiments, the second computing device may initiate a session, such as an information transaction session or communication session, when the second computing device receives from the first computing device login data, such as a username and password, that may be associated with an account or session identifier. In such embodiments, while the login data may be used to identify the account or the session, the login data may not be used for purposes of communication security or authentication of any computing device or user.

In some embodiments, the first computing device may generate a transitory identity and send the transitory identity to the second device together with the login data, or separately from the login data. The first computing device may generate the transitory identity based on dynamic and/or static aspects of or determined by the first computing device. In some embodiments, dynamic aspects of the first computing device may include aspects of the first computing device that change relatively rapidly, such as a clock time, a chip state, a register state, information received or detected by a sensor of the computing device (e.g., an accelerometer, optical sensor, temperature, humidity, and the like), location information from a Global Positioning System (GPS) device or a Wi-Fi signal, or any other source of data based on a dynamic aspect of the first computing device. In some embodiments, dynamic aspects determined the first computing device may include an image or video clip captured by a camera, a sound clip of ambient sounds captured by a microphone, an audio video clip captured by a camera and microphone, or any other information regarding a surroundings or ambient conditions of the first computing device. In some embodiments, dynamic aspects may be obtained from other sources that are random and frequently changing, such as external sensors and external sources of random information.

The second computing device may send an authentication query to a third computing device, which may function as an authentication server or certificate authority.

In some embodiments, the authentication query may include the transitory identity generated by the first computing device. In some embodiments, the authentication server may store the first computing device's transitory identity.

Based on the authentication query from the second computing device, the third computing device may send an authentication query to the first computing device. Responsive to the authentication query from the third computing device, the first computing device may send first computing device's transitory identity to the third computing device. In some embodiments, the first computing device may generate a hash of the first computing device transitory identity, and may send the generated hash of the first computing device's transitory identity to the third computing device.

In some embodiments, the third computing device may compare the first computing device's transitory identity received from the second computing device and the first computing device's transitory identity received from the first computing device. In response to determining that the two received transitory identities match, the third computing device may send an indication of authentication success of the first computing device to the second computing device. In response to determining that the two received transitory identities do not match, the third computing device may send an indication of first computing device authentication failure to the second computing device.

In some embodiments, the third computing device may maintain an audit trail of successful and failed login attempts. In some embodiments, the audit trail may include metadata identifying, for example, a time of each attempt, identifiers of the first and second computing devices (and any other participating computing devices), a frequency of use, a frequency of authentication failures, and other details. The audit trail may be used for risk analysis, and may be displayed and/or accessible via a dashboard or other reporting mechanism. In various embodiments, any of the participating computing devices may keep an audit trail. In some embodiments, copies of transitory identities may be stored as part of the audit trail. Such stored transitory identities may not be used for authentication purposes, but may be used to identify participating computing devices, as well as to confirm the participation in a particular information transaction by a particular computing device. In some embodiments, the information stored in the audit trail may be used to identify, for example, a computing device that has been targeted for attack in some manner.

Various embodiments provide a system that may authenticate the identity of the computing device in a communication system based on transitory and/or dynamic information of each computing device, in contrast to the current paradigm of shared secrets and static information. In various embodiments, a participating computing device may authenticate the identity of a second computing device using an ephemeral transitory identity that may be received from the second computing device and from a third computing device (e.g., an authentication server). The various embodiments stand in contrast to the current security paradigm, which is based on keeping secret a static unit of information, such as a static certificate. Because the transitory identity of each computing device is frequently changing, and each computing device is in periodic (or aperiodic) communication with other computing devices sending and/or receiving new transitory identities, various embodiments improve the function of any communication network or any electronic communication system by improving the security of communications. An adversary would be required to penetrate (at a minimum) three communication pathways—e.g., between the first and second computing devices, between the first and third computing devices, and between the second and third computing devices—simultaneously and synchronously in order to compromise communications between any two of the communication devices.

Various embodiments may be implemented using a variety of computing devices and/or communication networks or systems without requiring substantive changes or alterations of any presently-existing infrastructure. Various embodiments also improve the function of any communication network by reliably authenticating the identity of a participating computing device without relying on static identification information, such as a shared secret, that could be vulnerable to attack by access and/or copying.

In various embodiments, a computing device that is configured to perform the various methods may be de-authorized or blocked from accessing the system in the event of theft or cloning of the computing device.

Figure 1B:
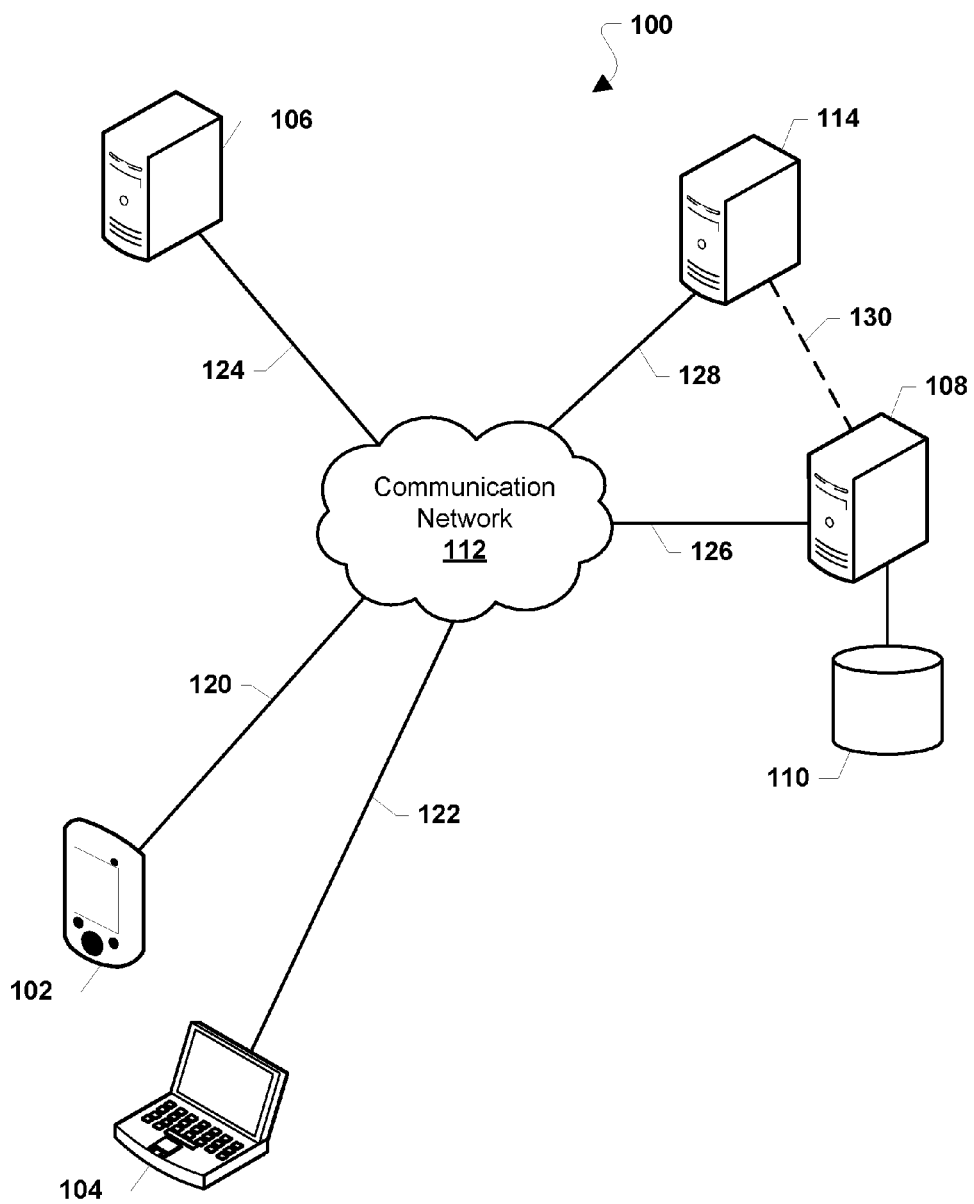

Various embodiments may be implemented within a variety of communication systems 150, an example of which is illustrated in FIG. 1A. The communication system 150 may include a variety of entities that may communicate using a communication network, such as an IoT network 154, a law firm 156, a defense contractor 158, a subcontractor 160, a bank 162, a health care entity 164, an online commerce entity 166, and a telecom entity 168. Each of the entities 154-168 may communicate with and among each other. Each of the entities 154-168 may also communicate with a certificate authority 152. The certificate authority 152 may include one or more computing devices configured to perform operations to enable the authentication of an identity of a computing device, as further described below. The entities 154-168 are merely exemplary, and the communication network 150 may include a wide variety of entities, including entities that may handle health care records, secure communications (e.g., for a business or government agency), public records, voting systems, financial services, security brokerage systems, IoT communications, commercial transactions, and a wide range of other contexts, Various embodiments may be implemented within a variety of communication systems 100, an example of which is illustrated in FIG. 1B. With reference to FIGS. 1A and 1B, the elements of communication system 100 may be used in any of the entities 154-168. The communication system 100 may include computing devices 102, 104, 106, and 108. In some embodiments, the computing devices 102 and 104 may include a computing device used directly by a user, such as a smart phone, a laptop computer, a desktop computer, and the like. It will be understood that a user may operate more than one such computing device similar to the computing devices 102 and 104. In some embodiments, the computing devices 102 and 104 may include one or more IoT devices. Non-limiting examples of IoT devices include personal or mobile multi-media players, gaming systems and controllers, smart televisions, set top boxes, smart kitchen appliances, smart lights and lighting systems, smart electricity meters, smart heating, ventilation, and air conditioning (HVAC) systems, smart thermostats, building security systems including door and window locks, vehicular entertainment systems, vehicular diagnostic and monitoring systems, machine-to-machine devices, and similar devices that include a programmable processor and memory and circuitry for establishing wireless communication pathways and transmitting/receiving data via wireless communication pathways. The computing devices 102 and 104 may also include an unmanned, autonomous, semi-autonomous, or robotic vehicle capable of travel of travel on land, sea, air, or in space. The computing devices 102 and 104 may further include a smart firearm or another processor-equipped weapon or weapon system.

In some embodiments, the computing devices 106 and 108 may include a back-end computing device such as a server. In some embodiments, the computing device 108 may communicate with an electronic security system 114 over a communication link 130. In some embodiments, the computing devices 106 and 108 (and possibly the computing device 114) may be operated by one entity. For example, a health care entity 164 or a telecom entity 168 may operate one or more of the computing devices 106, 108, and/or 114. In some embodiments, the computing devices 106, 108, and 114 may be operated by more than one entity.

Each of the computing devices 102, 104, 106, and 108, and the electronic security system 114 may communicate with a communication network 112 over a respective communication link 120, 122, 124, 126, 128, and 130. The communication links 120, 122, 124, 126, 128, and 130 may include wired or wireless communication links, and may further include additional devices to facilitate communication between the computing devices 102, 104, 106, and 108, the electronic security system 114, and the communication network 112. Examples of such additional devices may include access points, base stations, routers, gateways, wired and/or wireless communication devices, as well as backhaul communication links that may include fiber optic backhaul links, microwave backhaul links, and other suitable communication links.

In some embodiments, the computing device 106 may be configured to perform operations related to information transactions in a variety of contexts, including, without limitation, health care record management, secure communications, public records management systems, voting systems, financial services systems, security brokerage systems, as an IoT device controller, to perform a commercial transaction, as well as other contexts. In some embodiments, the computing device 108 may be configured to perform operations related to generating and/or obtaining transitory identities, and authentication of an identity of a computing device such as one or more of the computing devices 102, 104, and 106, as further described below.

In some embodiments, the electronic security system 114 may be configured to perform network monitoring or network security functions, such as a network monitoring system, a key logging system, or another similar system. In some embodiments, electronic security system 114 may detect an unauthorized user or electronic intruder using or accessing the communication network 112, and may send an indication to the computing device 108 of the detection of the unauthorized user or electronic intruder. In some embodiments, the electronic security system 114 may be configured to monitor for and/or detect unauthorized accesses of a system, memory, network element, or component of a network element from an otherwise authorized user (e.g., an "insider" threat). In some embodiments, the electronic security system 114 may be configured to receive a command or an indication that a computing device should be de-authorized from access to the communication system. For example, the electronic security system 114 may be a component or an element of a network authorization system, or a human resources system, or a system that provides a list of authorized users of the communication system, or another similar system. In such embodiments, the electronic security system 114 may receive a command or another message indicating that an authorization of a computing device should be removed or blocked. In some embodiments, in response to receiving an indication that an unauthorized user or electronic intruder has been detected, that a computing device authorization should be removed or blocked, or another similar indication, the computing device 108 may send an instruction to one or more of the computing devices 102, 104, and 106 to obtain a new transitory identity, as further described below.

The communication network 112 may include a variety of communication networks, including communication networks within an entity or enterprise, and external communication networks, publicly available communication networks, and combinations of networks as well as internetworks, including the internet. The communication network 112 may support communications using one or more wired and wireless communication protocols. Each of the communication links 120, 122, 124, and 126 may be two-way wired or wireless communication links. Wireless communication protocols may include one or more radio access technologies (RATs). Examples of wireless RATs include 3GPP Long Term Evolution (LTE), Worldwide Interoperability for Microwave Access (WiMAX), Code Division Multiple Access (CDMA), Time Division Multiple Access (TDMA), Wideband CDMA (WCDMA), Global System for Mobility (GSM), and other RATs. Examples of RATs may also include Wi-Fi, Bluetooth, Zigbee, LTE in Unlicensed spectrum (LTE-U), License Assisted Access (LAA), and MuLTEfire (a system that uses LTE on an unlicensed carrier band). Wired communication protocols may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

While the communication links 120, 122, and 124 are illustrated as single links, each of the communication links may include a plurality of wired or wireless links, such as plurality of frequencies or frequency bands, each of which may include a plurality of logical channels. Additionally, each of the various communication links 120, 122, and 124 may utilize more than one communication protocol.

The computing device 108 may communicate with a data store 110, such as a memory device, database, server device, or another device capable of storing data. In some implementations, the data store 110 may store an audit trail and associated metadata.

Figure 1C:
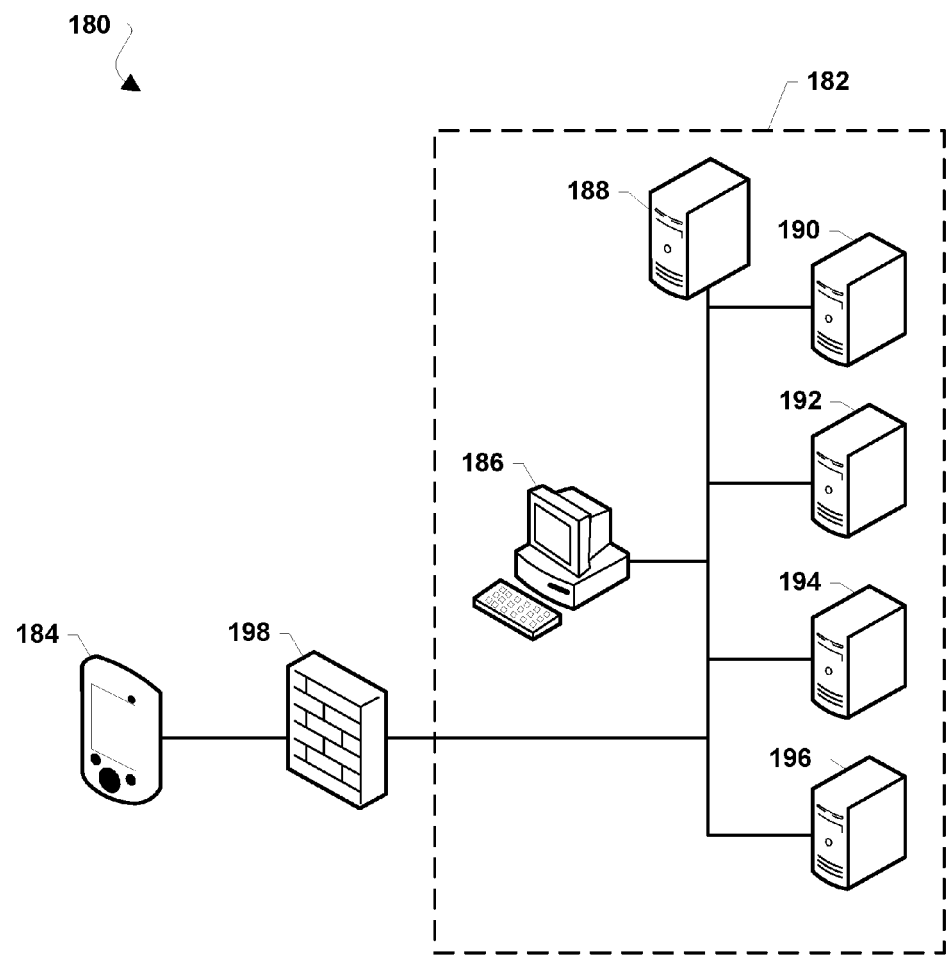

Various embodiments may be implemented within a variety of communication systems 180, an example of which is illustrated in FIG. 1C. With reference to FIGS. 1A-1C, the elements of communication system 150 may be used in any of the entities 154-168. The communication system 180 may include computing devices 184, 186, 188, 190, 192, 194, and 196. The computing devices 190-196 may include network elements, such as file servers, databases, or other similar network-accessible data sources. The computing devices 184 and 186 may include any form of user-operable network terminal, and may be similar to the computing devices 102 and 104. The computing devices 186-196 may be elements in a communication network 182, access to which may be protected by a device configured to protect electronic access to the communication network 182, such as a firewall 198.

Conventional communication security implementations, such as the firewall 198, may protect the network 182 against attacks or exploitation by an external device, such as the computing device 184. However, the firewall 198 may not protect the network 182 against attacks or explication from a device that is inside the firewall 198, such as the computing device 186.

Various embodiments may include the computing device 188 (which may be similar to the third computing device 108), which may be configured to perform operations related to generating and/or obtaining transitory identities, and authentication of an identity of a computing device such as one or more of the computing devices 184, 186, 190, 192, 194, and 196.

In various embodiments, while the firewall 198 may be employed to perform network operations such as traffic monitoring, gateway functions, routing, and other similar functions, the firewall 198 may not perform a security function or an authentication function of devices such as the computing devices 184 and 186. Rather, in the communication system 180, the computing devices 184 and 186 may communicate with the computing device 188 and/or with each other, enabling authentication of an identity of each of the computing devices 184 and 186, as well as, in some embodiments, an identity of the computing device 188. Similarly, while the communication system 180 may use inputs received at the computing device 184 or 186, such as a username and password, to identify a purported user or as a pointer to a user account, communication system 180 may not use credentials such as a username and password for security purposes or for authentication purposes. Rather, the communication system 180 may authenticate the identity of the computing devices 184 and 186 based on transitory and/or dynamic information of each computing device, as further described below.

Figure 2:
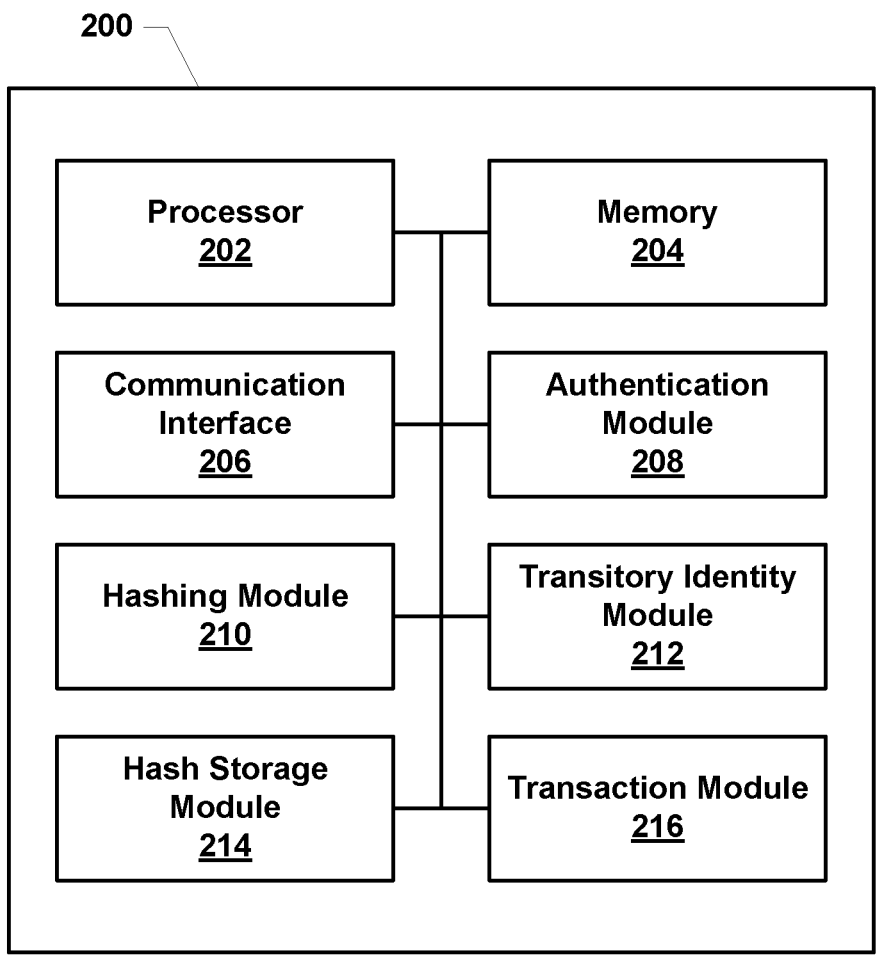
FIG. 2 is a component block diagram of a communication device suitable for use with various embodiments.

FIG. 2 is a component block diagram of a computing device 200 suitable for implementing various embodiments. With reference to FIGS. 1 and 2, in various embodiments, the computing device 200 may be similar to the computing devices 102, 104, 106, and 108.

The computing device 200 may include a processor. The processor 202 may be configurable with processor-executable instructions to execute operations of the various embodiments, a specialized processor, such as a modem processor, configurable with processor-executable instructions to execute operations of the various embodiments in addition to a primary function, a dedicated hardware (i.e., "firmware") circuit configured to perform operations of the various embodiments, or a combination of dedicated hardware/firmware and a programmable processor.

The processor 202 may be coupled to memory 204, which may be a non-transitory computer-readable storage medium that stores processor-executable instructions. The memory 204 may store an operating system, as well as user application software and executable instructions. The memory 204 may also store application data, such as an way data structure. The memory 204 may include one or more caches, read only memory (ROM), random access memory (RAM), electrically erasable programmable ROM (EEPROM), static RAM (SRAM), dynamic RAM (DRAM), or other types of memory. The processor 202 may read and write information to and from the memory 204. The memory 204 may also store instructions associated with one or more protocol stacks. A protocol stack generally includes computer executable instructions to enable communication using a radio access protocol or communication protocol.

The processor 202 may also communicate with a variety of modules for units configured to perform a variety of operations, as further described below. For example, the processor 202 may communicate with a communication interface 206, an authentication module 208, a hashing module 210, a transitory identity module 212, the hash storage module 214, and a transaction module 216. The modules/units 206-216 may be implemented on the computing device 200 in software, and hardware, or in a combination of hardware and software. Firmware, chip, system-on-a-chip (SOC), dedicated hardware (i.e., "firmware") circuit configured to perform operations of the various embodiments, or a combination of dedicated hardware/firmware and a programmable processor. The processor 202, the memory 204, and the various modules/units 206-216 may communicate over a communication bus or any other communication circuitry or interface.

The communication interface 206 may include a network interface that may enable communications with to a communication network (e.g., the communication network 112). The communication interface 206 may include one or more input/output (I/O) ports through which a connection, such an Ethernet connection, a fiber optic connection, a broadband cable connection, a telephone line connection, or other types of wired communication connection may be provided. The communication interface 206 may also include a radio unit that may enable radio frequency communication.

The authentication module 208 may provide or be in communication with one or more input devices to receive an input from a user for login to the computing device 200. The input devices may include one or more buttons, sliders, touchpads, keyboards, biometric input devices, cameras, fingerprint readers, and other similar input devices.

The transitory identity module 212 may generate a transitory identity for the computing device 200. The transitory identity may be based on one or more dynamic aspects of the computing device 200, individually or in combination with other dynamic or static information. The dynamic aspects of the computing device 200 may include aspects of the first computing device that change relatively rapidly, such as a clock time, a chip state, a register state, or any other source of data based on a dynamic aspect of the first computing device.

The hashing module 210 may generate hash of a transitory identity that is generated by the transitory identity module 212. The hash storage module 214 may include a memory device, or may communicate with the memory 204, to store a transitory identity generated by the transitory identity module 212 and/or a hash of a transitory identity generated by the hashing module 210.

The transaction module 216 may enable communication related to a transaction (as well as other communications) with another computing device (for example, between the computing device 102 and the computing device 106). In some implementations, the transaction module 216 may include hardware and/or software configured to provide a streamlined communication and/or transaction process with the transaction server. In some implementations, the transaction module may include hardware and/or software configured to provide a streamlined communication related to a specific service provider, such as a so-called "1-click" service or another streamlined communication/transaction process.

Figure 3A:
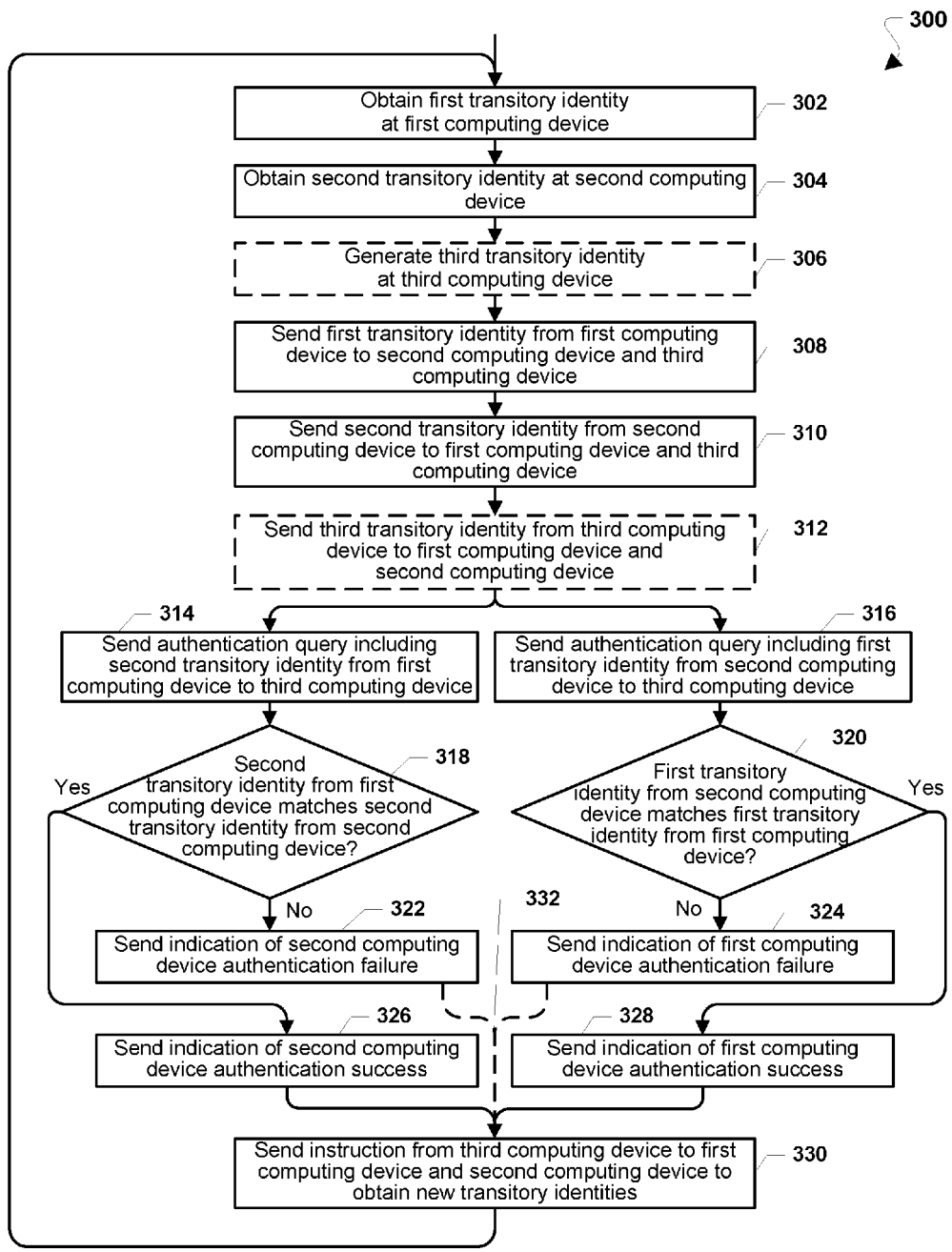
FIG. 3A is a process flow diagram illustrating a method of authenticating one computing device to another computing device according to various embodiments.
Figure 3B:
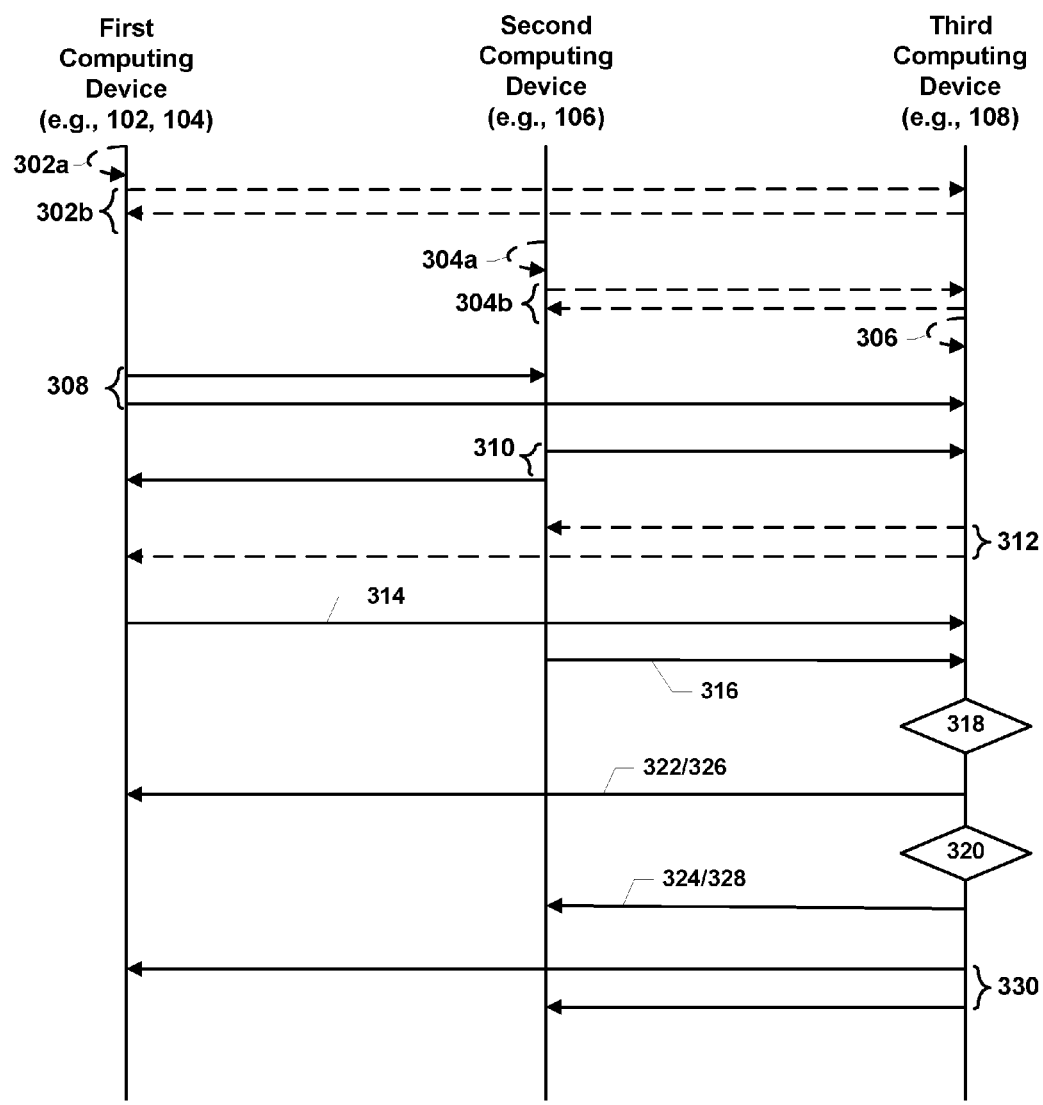
FIG. 3B is a message flow diagram illustrating another method of authenticating one computing device to another computing device according to various embodiments.
Figure 3C:
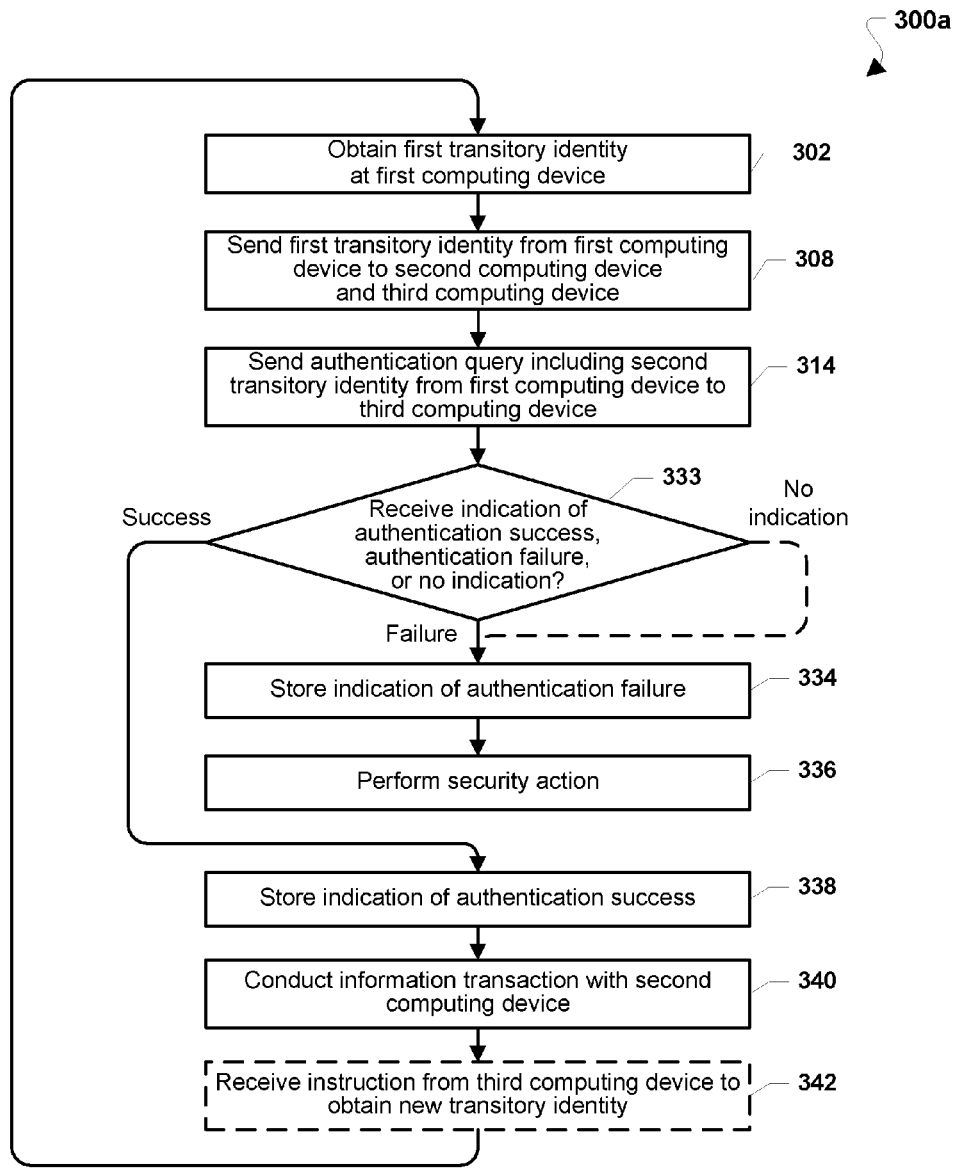
FIG. 3C illustrates a method 300*a* of operations executed by the first computing device as part of the method 300.

FIGS. 3A and 3B illustrate a system method 300 of authenticating a first computing device (e.g., the computing device 102, 104, 184, 186, and 200 of FIGS. 1B-2) to a second computing device (e.g., the computing device 106, 190-196, and 200 of FIGS. 1B-2), and vice versa, through interactions with a third computing device (e.g., 108, 188, and 200 of FIGS. 1B-2) according to some embodiments. FIG. 3C illustrates a method 300a of operations executed by the first computing device as part of the method 300. FIG.

3D illustrates a method 300b of operations executed by the second computing device as part of the method 300. FIG. 3E illustrates a method 300c of operations executed by the third computing device as part of the method 300. With reference to FIGS. 1A-3E, the method 300 may be implemented by a processor (e.g., the processor 202 and/or the like) of a first computing device (i.e., a device processor), a processor of a second computing device, and a processor of a third computing device.

In various embodiments, prior to or as part of the method 300, a first computing device (e.g., the computing device 102 or 104) and a second computing device (e.g., the computing device 106) may establish accounts with a third computing device (e.g., the computing device 108), which may, in some embodiments, function as an authentication server. In various embodiments, the first computing device and the second computing device may be configured with (e.g., initialize, configure, install, etc.) one or more modules enabling each computing device to perform the operations of the method 300 (e.g., the modules 206-216).

In some embodiments, establishing an account with the third computing device may include determining and/or negotiating a communication path between the third computing device and the first/second computing device. In some embodiments, each of the first and second computing devices may negotiate or determine a communication path with the third computing device that differs in one or more aspects. For example, each computing device pair may use a different encryption method or protocol, communication protocol or application (e.g., hypertext markup language (HTML), short message service (SMS) text message), and the like. In various embodiments, a user may establish a plurality of accounts with a plurality of authentication servers without limitation.

Various embodiments may provide a defense against the penetration and compromise of communications between any two of the first computing device, the second computing device, and the third computing device. For example, an attacker performing a man-in-the-middle (MITM) attack may secretly relay communications between two network devices, and may monitor and/or alter those communications. Various embodiments would require an attacker to simultaneously compromise three communication pathways nearly simultaneously: a first communication pathway between the first computing device and the second computing device, a second communication pathway between the second computing device and the third computing device, and a third communication pathway between the third computing device and the first computing device. Because the transitory identities are dynamic and frequently changed, an attacker would have to steal or intercept, and decrypt extremely rapidly, transitory identities sent using the three communication pathways. This potential vulnerability is defeated by the short validity duration of the different authentication informations exchanged between the three computing devices over the three separate communication pathways.

In block 302 of the method 300 and 300a, a processor of a first computing device (e.g., the computing device 102 or 104) may obtain a first transitory identity. In some embodiments, the processor of the first computing device may obtain the first transitory identify by generating the first transitory identity (e.g., operation 302a). In some embodiments, the processor of the first computing device may obtain a generated first transitory identity from a third computing device (e.g., the computing device 108) (e.g., operation 302b). In some embodiments, the processor of the third computing device may push the generated first transitory identity to the first computing device (e.g., the third computing device may send the generated transitory identity to the first computing device without a request from the first computing device). In some embodiments, the processor of the first computing device may pull the first transitory identity from the third computing device. For example, the first computing device may send a request for the transitory identity to the third computing device, and the third computing device may send the transitory identity to the first computing device in response to the request.

In block 304 of the method 300 and 300b, a processor of the second computing device (e.g., the computing device 106) may generate a second transitory identity (e.g., operation 304a). In some embodiments, the processor of the second computing device may obtain the first transitory identify by generating the second transitory identity. In some embodiments, the processor of the second computing device may obtain a second transitory identity from the third computing device (e.g., operation 304b). In some embodiments, the processor of the third computing device may push the second transitory identity to the second computing device. In some embodiments, the processor of the second computing device may pull the generated second transitory identity from the third computing device.

In optional block 306 of the method 300 and 300c, a processor of the third computing device (e.g., the computing device 108) may generate a third transitory identity.

In block 308 of the method 300 and 300a, the processor of the first computing device may send the first transitory identity to the second computing device and the third computing device. The transmission of the first transitory identity to the second computing device may be via any open communication link, such as a communication link that is in the process of being established between the first computing device and the second computing device. In some embodiments, the communication may be encrypted, and thus the transmission may be accomplished after an initial encryption key has been exchanged. In some embodiments, the communication link may be open (i.e., not encrypted) so that the computing devices can authenticate one another via various embodiments before exchanging encryption keys. The transmission of the first transitory identity to the third computing device may be via another communication link, which may be encrypted or not encrypted. In some embodiments, this transmission may be via a public network, such as the Internet. In some embodiments, this transmission may be via private or dedicated communication link.

In block 310 of the method 300 and 300b, the processor of the second computing device may send the second transitory identity to the first computing device and the third computing device. The transmission of the second transitory identity to the first computing device may be via any open communication link, such as the communication link that is in the process of being established between the first computing device and the second computing device by which the second computing device receives the first transitory identity. In some embodiments, the communication may be encrypted, and thus the transmission may be accomplished after an initial encryption key has been exchanged. In some embodiments, the communication link may be open (i.e., not encrypted) so that the computing devices can authenticate one another via various embodiments before exchanging encryption keys. The transmission of the second transitory identity to the third computing device may be via another communication link, which may be encrypted or not encrypted. In some embodiments, this transmission may be via a public network, such as the Internet. In some embodiments, this transmission may be via private or dedicated communication link.

In optional block 312 of the method 300 and 300c, the processor of the third computing device may send the third transitory identity to the first computing device and the second computing device. The transmission of the third transitory identity to the first and second computing devices may be via the same communication links by which the third computing device received the first and second transitory identities. Such communication links may be encrypted or not encrypted. In some embodiments, this transmission may be via a public network, such as the Internet. In some embodiments, this transmission may be via private or dedicated communication link.

In block 314 of the method 300 and 300a, the processor of the first computing device may send an authentication query including the second transitory identity to the third computing device. In some embodiments, the first computing device may send the authentication query automatically, such as in the background. In some embodiments, the first computing device may send the authentication query in response to a command. In some embodiments, the authentication request may include a small unit of information that may be stored at the first computing device, such as text, an image, biometric information, or other readily personalizable information. In some embodiments, the first computing device may include the small unit of information in or with the authentication request.

In block 316 of the method 300 and 300b, the processor of the second computing device may send an authentication query including the first transitory identity to the third computing device.

In determination block 318 of the method 300 and 300c, the processor of the third computing device may determine whether the second transitory identity from the first computing device matches the second transitory identity from the second computing device. In some embodiments, the third computing device may perform this operation by a direct comparison of the two received transitory identities (e.g., a subtraction and check for remainder). In some embodiments, the third computing device may perform this operation by performing a hash function on one or both of the received transitory identities and determining whether the two match by comparing the results of the hash function(s).

In response to determining that the second transitory identity from the first computing device does not match the second transitory identity from the second computing device (i.e., determination block 318="No"), the processor of the third computing device may send an indication of authentication failure of the second computing device to the first computing device and/or the second computing device in block 322.

In response to determining that the second transitory identity from the first computing device matches the second transitory identity from the second computing device (i.e., determination block 318="Yes"), the processor of the third computing device may send an indication of authentication success of the second computing device to the first computing device and/or the second computing device in block 326.

In determination block 320 of the method 300 and 300c, the processor of the third computing device may determine whether the first transitory identity from the second computing device matches the first transitory identity from the first computing device.

In response to determining that the first transitory identity from the second computing device does not match the first transitory identity from the first computing device (i.e., determination block 320="No"), the processor of the third computing device may send an indication of authentication failure of the first computing device to the first computing device and/or the second computing device in block 324.

In response to determining that the first transitory identity from the second computing device matches the first transitory identity from the first computing device (i.e., determination block 320="Yes"), the processor of the third computing device may send an indication of authentication success of the second computing device to the first computing device and/or the second computing device in block 328.

In some implementations, the indications of authentication failure or authentication success may include a very short message or data structure, and some implementations, the indication may include a single bit, such as a 0 or a 1, indicating authentication failure or authentication success, respectively.

Following the operations of blocks 326 and/or 328 of the methods 300 and 300c, the processor of the third computing device may send an instruction to the first computing device and the second computing device to obtain new transitory identities in block 330. In some embodiments, the instruction may include an instruction to generate a new transitory identity at the first and second computing devices, respectively. In some embodiments, the instruction may include an instruction to each of the first and second computing devices respectively to obtain a new transitory identity from the third computing device. In some embodiments, the third computing device may generate and send a new transitory identity for each of the first and second computing devices without a request from either the first or second computing device.

The processors of the first, second, and third computing devices may then perform the operations of blocks 302, 304, and 306 of the methods 300, 300a, 300b and 300c, respectively. The first, second, and third computing devices may periodically repeat the operations of the methods 300, 300a, 300b and 300c to perform continuous, periodic background authentication of the other computing devices. In some embodiments, the processors of the first, second, and third computing devices may periodically repeat the operations of the methods 300, 300a, 300b and 300c with or without an instruction or other message from another of the first, second, and third computing devices. By using a dynamic system of device authentication, the methods 300, 300a, 300b and 300c substantially reduces the possibility that any of the transitory identities may be intercepted and used to impersonate one of the computing devices.

In some embodiments, the third computing device may perform the operations of block 330 and 300c in the event of an authentication failure of the first computing device and/or the second computing device 332. For example, the third computing device may respond to an authentication failure of a computing device as an indication of a compromise or an attempted compromise of a participating computing device, or of the system. In various embodiments, as a response to a possible breach or an actual breach of a system's communications, the third computing device may instruct all participating computing devices to obtain new transitory identities. Because only computing devices that are configured to participate in the system may be able to obtain a new transitory identity, computing devices that are not so configured—such as cyber intruders and other adversaries—may be unable to obtain a new transitory identity, and will be effectively blocked from further communication using the system.

In some embodiments, the processors of the first, second, and third computing devices may repeat their respective operations at a frequency that is less than a determined time required for an attacker to obtain and use the first and/or second transitory identities. For example, in some embodiments, the duration of the first, second, and/or third transitory identities (the "validity durations") may be set to be shorter than the time required by an attacker to obtain and exploit one or more of the transitory identities. In some embodiments, the processor of the first and/or second third computing devices may obtain a new transitory identity in response to determining that the validity duration of the respective first and/or second transitory identity has expired. In some embodiments, the processor of the third computing device may generate a new transitory identity for the first, second, and/or third computing devices in response to determining that the validity duration of the respective first and/or second transitory identity has expired.

FIG. 3C illustrates a method 300a of operations executed by the first computing device as part of the method 300. With reference to FIGS. 1A-3E, the method 300a may be implemented by a processor (e.g., the processor 202 and/or the like). In blocks 302, 308, and 314, the processor of the first computing device may perform operations of like numbered blocks of the method 300.

In determination block 333, the processor of the first computing device may determine whether an indication of authentication success or an indication of authentication failure is or has been received from the third computing device. In some optional embodiments, the processor may also determine whether no indication is received from the third computing device.

In response to determining that an indication of authentication failure is or has been received (i.e., determination block 333="Failure"), or optionally that no indication has been received (determination block 333="No indication"), the processor of the first computing device may store an indication of the authentication failure in block 334.

In block 336, the processor of first computing device may perform a security action. For example, the processor of the first computing device may stop performing the information transaction with the second computing device. The processor of the first computing device may also block further communication with the second computing device.

In response to determining that an indication of authentication success is or has been received (i.e., determination block 333="Success"), the processor of the first computing device may store an indication of the authentication success in block 338.

In block 340, the processor of the first computing device may conduct the information transaction with the second computing device. The processor of the first computing device may then obtain a new transitory identity in block 302. For example, the processor of the first computing device may determine that a validity duration of the transitory identity has expired, and in response to determining that the validity duration of the transitory identity has expired the processor of the first computing device may obtain a new transitory identity in block 302.

In optional block 342, the processor of the first computing device may receive an instruction from the third computing device to obtain a new transitory identity. The processor of the first computing device may then perform the operations of block 302.

Figure 3D:
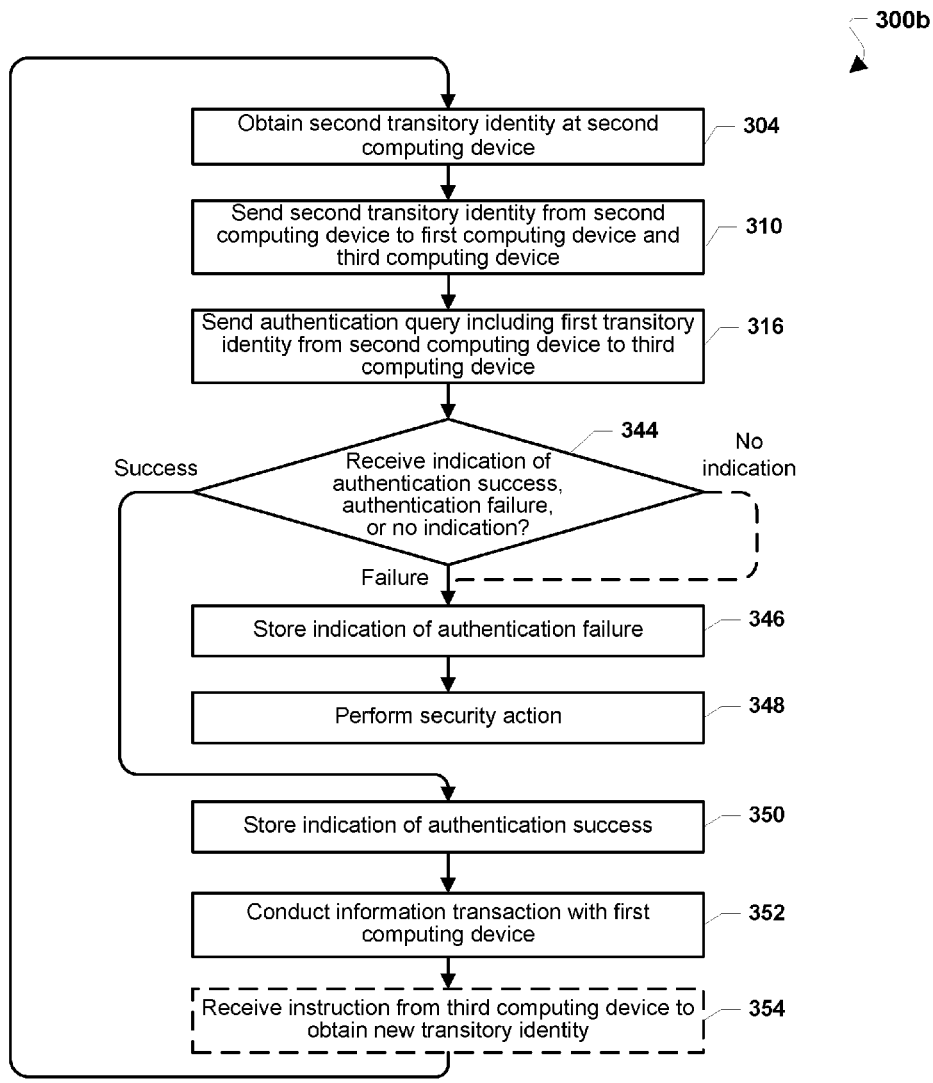
FIG. 3D illustrates a method 300*b* of operations executed by the second computing device as part of the method 300.
Figure 3E:
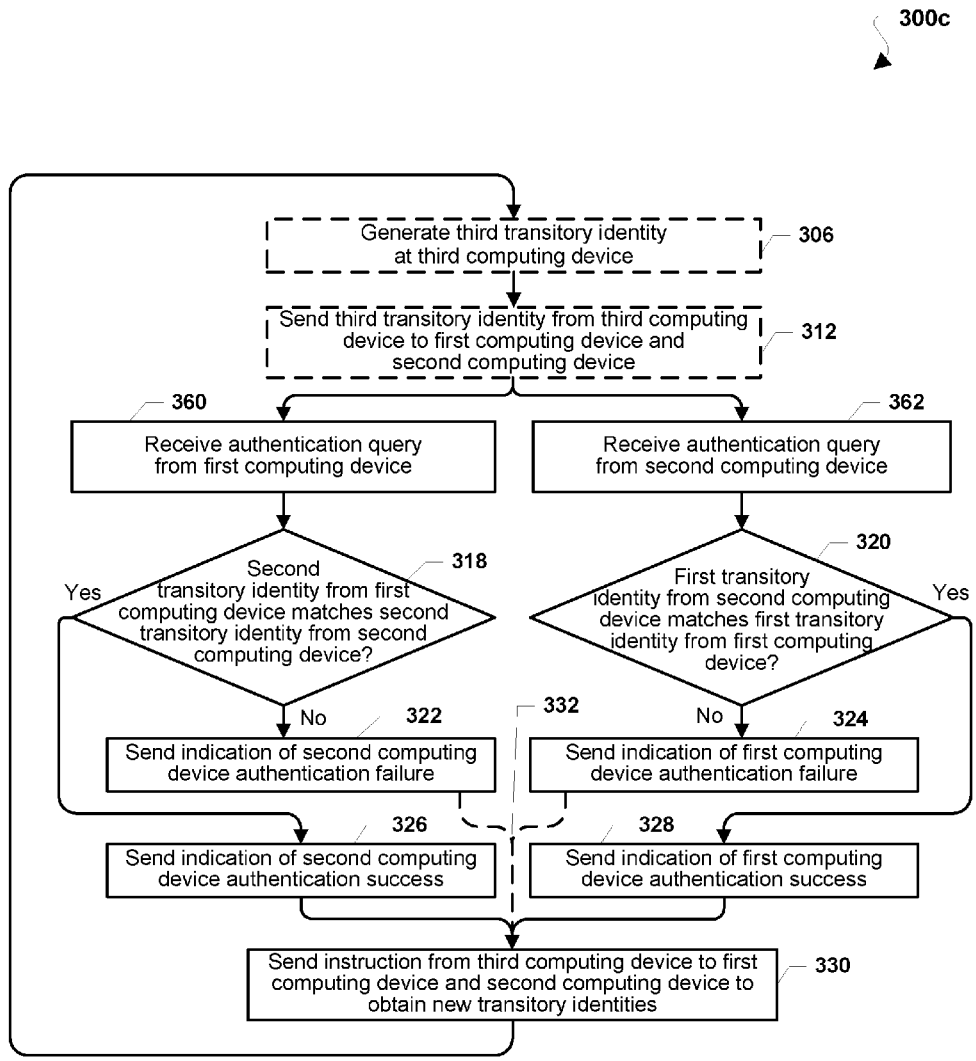
FIG. 3E illustrates a method 300c of operations executed by the third computing device as part of the method 300.

FIG. 3D illustrates a method 300b of operations executed by the second computing device as part of the method 300. With reference to FIGS. 1A-3E, the method 300b may be implemented by a processor (e.g., the processor 202 and/or the like). In blocks 304, 310, and 316, the processor of the second computing device may perform operations of like numbered blocks of the method 300.

In determination block 344, the processor of the second computing device may determine whether an indication of authentication success or an indication of authentication failure is or has been received from the third computing device. In some optional embodiments, the processor may also determine whether no indication is received from the third computing device.

In response to determining that an indication of authentication failure is or has been received (i.e., determination block 344="Failure"), or optionally that no indication has been received (determination block 344="No indication"), the processor of the second computing device may store an indication of the authentication failure in block 346.

In block 348, the processor of second computing device may perform a security action. For example, the processor of the second computing device may stop performing the information transaction with the first computing device. The processor of the second computing device may also block further communication with the first computing device.

In response to determining that the processor receives an indication of authentication success (i.e., determination block 344="Success"), the processor of the second computing device may store an indication of the authentication success in block 350.

In block 352, the processor of the second computing device may conduct the information transaction with the first computing device.

The processor of the second computing device may then obtain a new transitory identity in block 304. For example, the processor of the second computing device may determine that a validity duration of the second transitory identity has expired, and in response to determining that the validity duration of the second transitory identity has expired the processor of the second computing device may obtain a new transitory identity in block 304.

In optional block 354, the processor of the second computing device may receive an instruction from the third computing device to obtain a new transitory identity. The processor of the second computing device may then perform the operations of block 304.

FIG. 3E illustrates a method 300c of operations executed by the third computing device as part of the method 300. With reference to FIGS. 1A-3E, the method 300c may be implemented by a processor (e.g., the processor 202 and/or the like). In blocks 306-330 the device processor of the third computing device may perform operations of like numbered blocks of the method 300.

In block 360, the processor of the third computing device may receive an authentication query from the first computing device. In determination block 318, the processor of the third computing device may determine whether the second transitory identity from the first computing device matches the second transitory identity from the second computing device, as described above.

In block 362, the processor of the third computing device may receive an authentication query from the second computing device. In determination block 320, the processor of the third computing device may determine whether the first transitory identity from the second computing device matches the first transitory identity from the first computing device, as described above.

Figure 4A:
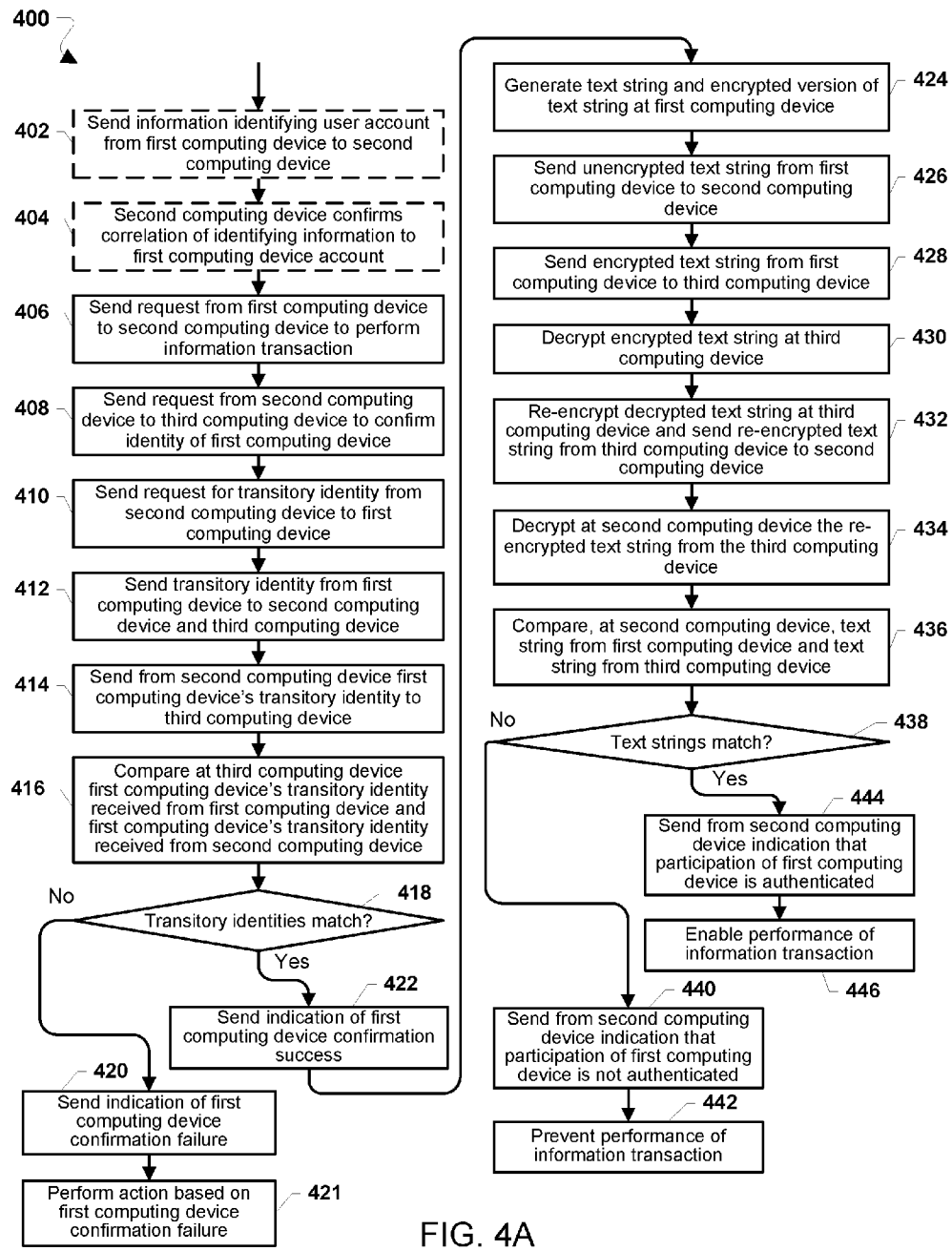
FIG. 4A is a process flow diagram illustrating a method of authenticating one computing device to another computing device and authorizing an information transaction between the two devices according to various embodiments.
Figure 4B:
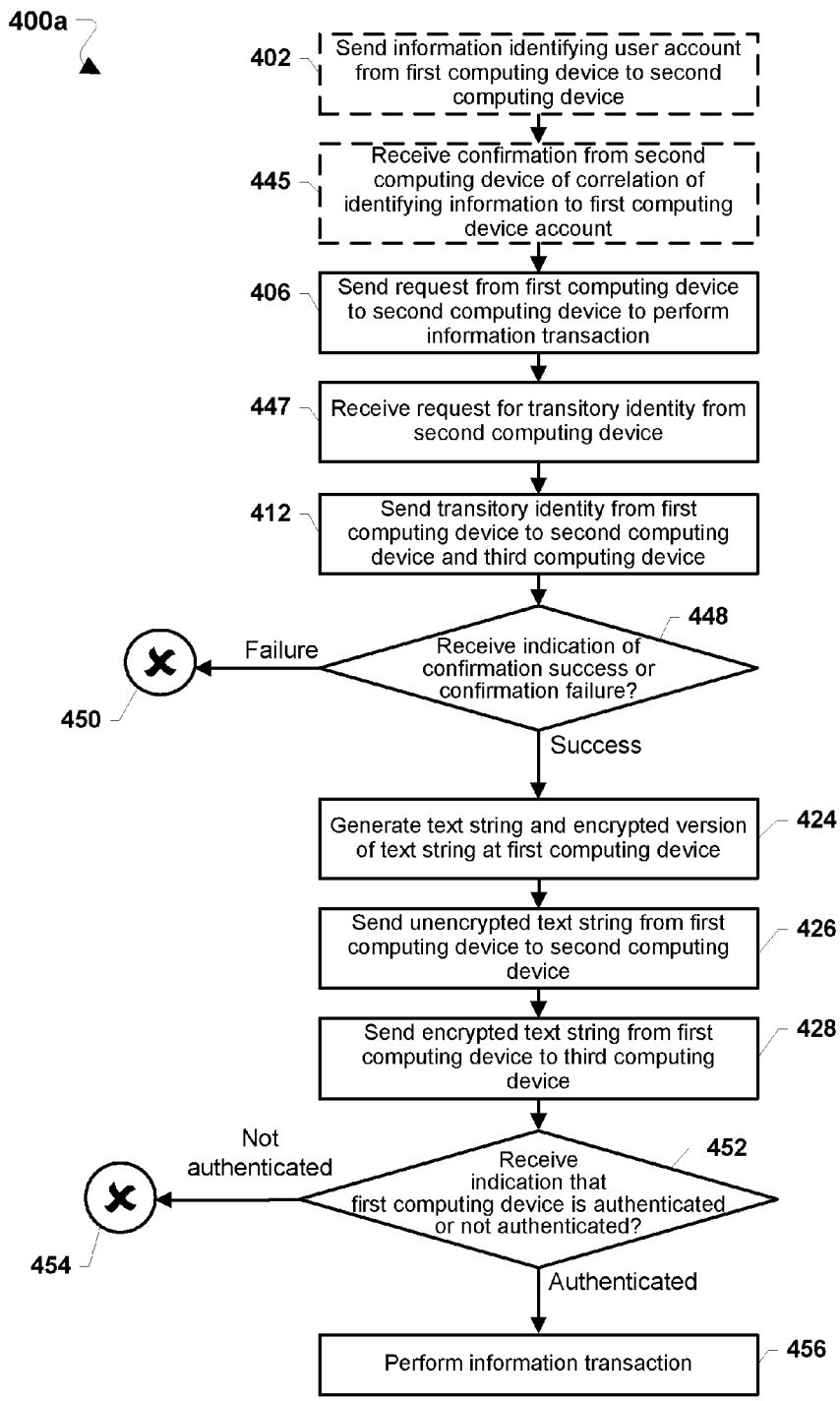
FIG. 4B illustrates a method 400a of operations executed by the first computing device as part of the method 400.
Figure 4C:
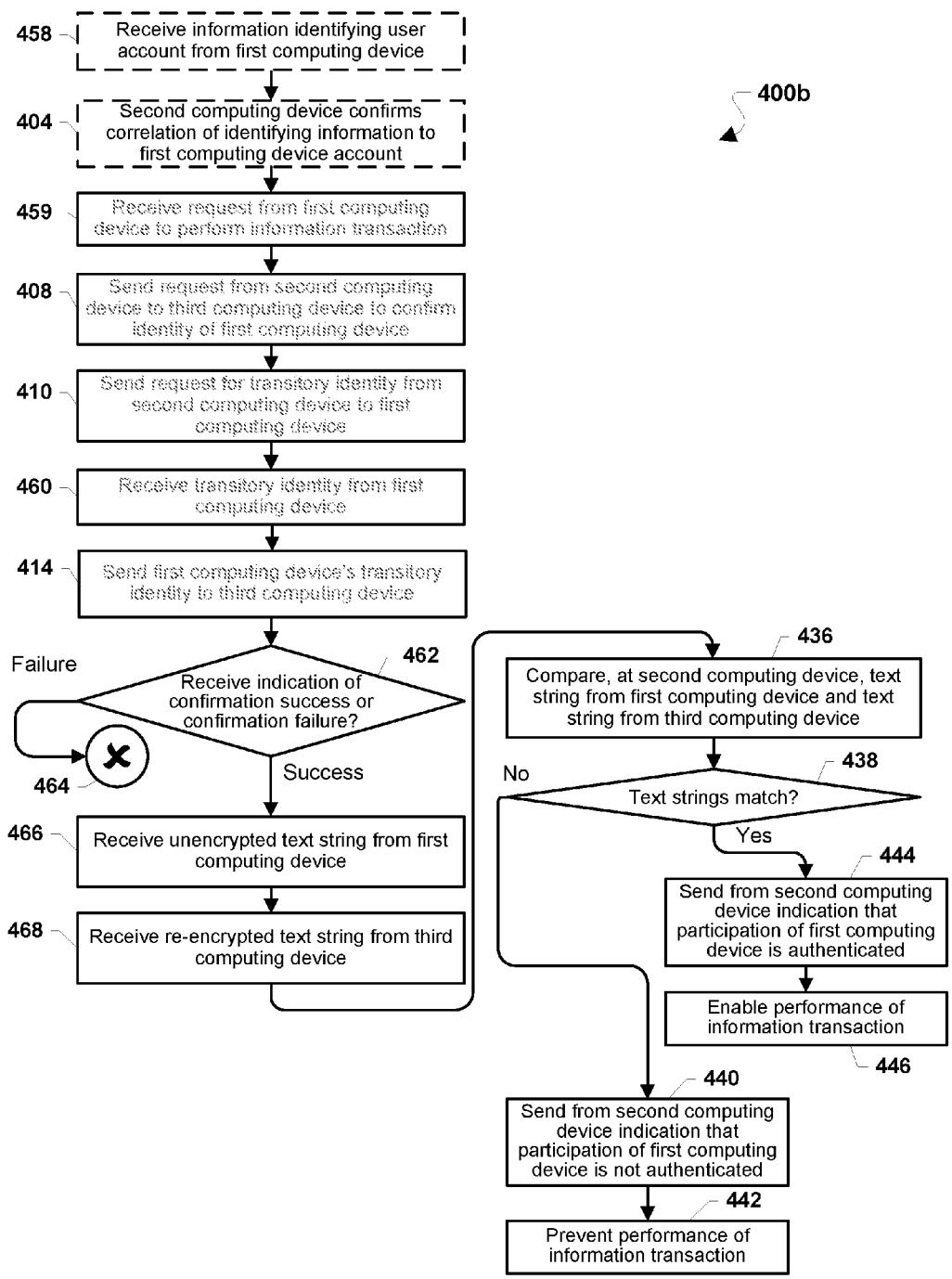
FIG. 4C illustrates a method 400b of operations executed by the second computing device as part of the method 400.
Figure 4D:
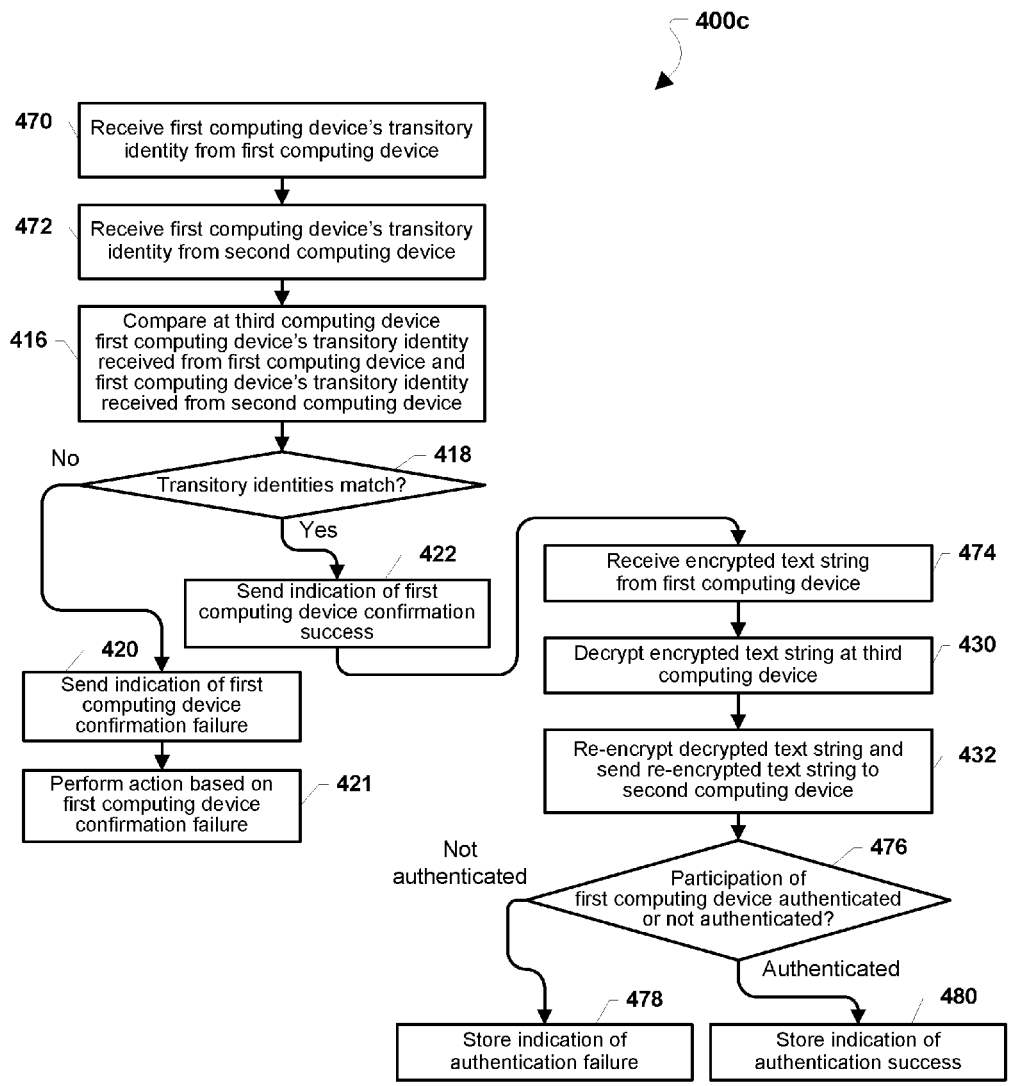
FIG. 4D illustrates a method 400c of operations executed by the third computing device as part of the method 400.

FIG. 4A illustrates a method 400 of authenticating a computing device and authorizing an information transaction of a first computing device (e.g., the computing device 102, 104, 184, 186, and 200 of FIGS. 1B-2) with a second computing device (e.g., the computing device 106, 190-196, and 200 of FIGS. 1B-2), and vice versa, through interactions with a third computing device (e.g., 108, 188, and 200 of FIGS. 1B-2) according to some embodiments. FIG. 4B illustrates a method 400a of operations executed by the first computing device as part of the method 400. FIG. 4C illustrates a method 400b of operations executed by the second computing device as part of the method 400. FIG. 4D illustrates a method 400c of operations executed by the third computing device as part of the method 400. With reference to FIGS. 1A-4D, the method 400 may be implemented by a processor (e.g., the processor 202 and/or the like) of the computing device (i.e., a device processor).

In optional block 402, the processor of a first computing device (e.g., the computing device 102 and 104) may send information identifying a user account to a second computing device (e.g., the computing device 106).

In optional block 404, the processor of the second computing device may confirm the correlation of the identifying information to an account of the first computing device. In some embodiments, the second computing device may send a message indicating the confirmation to the first computing device.

In some embodiments, the identifying information used in block 402 may include a previously-used transitory identity used in communication with the second computing device, such as a most-recently used or last-used transitory identity, that was used for communication between the first and second computing device. In such embodiments, the a previously-used transitory identity may be used for initial identification purposes only, and may not be used to authenticate the identity of the first communication device. In some embodiments, use of the previously-used transitory identity may enable enhanced identification (but not authentication) of a purported identity of the first computing device. In some embodiments, because the second computing device has previously received the previously-used transitory identity, the previously-used transitory identity may be used for two-factor (or multi-factor) identification of the first computing device. Further, since the previously-used transitory identity may not be displayed or presented to a user of the first computing device, by virtue of being extremely difficult to obtain from the first computing device, using the previously-used transitory identity to initially identify the first computing device may be more secure than a user name and password, which may be observed for example by observation of a display of the first being device. In some embodiments, the previously-used transitory identify may also be used to rapidly recover a state of a previous communication (e.g., a website being browsed, a message being read, an image being viewed, etc.). In some embodiments, such state information may be encoded in the transitory identity.

In some embodiments, the identifying information may include a traditional username and password or other conventional identifying information. In such embodiments, the identifying information may be used only for the purpose of identifying the purported identity of the first communication device, and not for authentication of the first computing device or the second computing device.

In block 406, a processor of the first computing device may send a request to the second computing device to perform an information transaction. In some embodiments, the information transaction may include the provision of information to an electronic health records service or a public records service, a voter registration database or voting system, an online purchase, a banking transaction, or another similar exchange of information or electronic transaction.

In block 408, a processor of the second computing device may send a request to the third computing device to confirm the identity of the first computing device.

In block 410, the processor of the second computing device may send a request for a transitory identity to the first computing device. In some implementations, the request may include an instruction to generate, or may trigger the generation of, a new transitory identity by the first computing device. In some embodiments, the request may include an instruction to obtain a new transitory identity from the third computing device. This transmission of the transitory identity may be accomplished by or using any of the communication channels and methods described with reference to the method 300.

In block 412, the processor of the first computing device may send a transitory identity from the first computing device to the second computing device and to the third computing device. This transmission of the transitory identity may be accomplished by or using any of the communication channels and methods described with reference to the method 300.

In block 414, the second computing device may send the transitory identity received from the first computing device to the third computing device. The third computing device thus may receive a transitory identity generated by the first computing device from the first computing device and, along a separate communication path, the first computing device's transitory identity from the second computing device. This transmission of the transitory identity may be accomplished by or using any of the communication channels and methods described with reference to the method 300.

In block 416, a processor of the third computing device may compare the transitory identity of the first computing device received from the first computing device and the transitory identity of the first computing device received from the second computing device.

In determination block 418, the processor of the third computing device may determine whether the transitory identities match.

In response to determining that the transitory identities do not match (i.e., determination block 418="No"), the processor of the third computing device may send an indication of confirmation failure of the first computing device in block 420. This transmission of the indication of confirmation failure may be accomplished by or using any of the communication channels and methods described with reference to the method 300 for similar transmissions. In some embodiments, the processor of the third computing device may send the failure notification to the second computing device. In some embodiments, the processor of the third computing device may send a failure notification to a third party, such as to a computing device of an information security officer.

In block 421, the third computing device may perform an action based on the first computing device confirmation failure. In some embodiments, the processor of the third computing device may send a failure notification to an email on record that is associated with the first computing device, to notify a registered user of the first computing device of a possible compromise of the first computing device. In some embodiments, the processor of the third computing device may determine whether more than one computing device purporting to be the first computing device. Detection of more than one computing device purporting to be the first computing device may indicate that the first computing device has been cloned or otherwise copied in some manner. In some embodiments, if the processor of the third computing device detects a clone/copied computing device, the third computing device may send an alert, made de-authorize the first computing device from participating in the system, may lock the first computing device out of the system, and/or may send command deactivating the first computing device.

In response to determining that the transitory identities match (i.e., determination block 418="Yes"), the processor of the third computing device may send an indication of the confirmation success of the first computing device in block 422. This transmission of the indication of confirmation success may be accomplished by or using any of the communication channels and methods described with reference to the method 300 for similar transmissions. In some embodiments, the processor of the third computing device may send an indication of the confirmation success to the second computing device and to the first computing device.

In various embodiments, following the confirmation of the identity of the first computing device, the participating computing devices may perform operations to enable the authentication of the participation of one or more of the participating computing devices (e.g., the first computing device, the second computing device, etc). In some embodiments, authenticating the participation of one or more of the participating computing devices may enable an information transaction to be non-repudiable. In some embodiments, the operations enabling authentication of the participation of one or more of the participating computing devices may serve as a substitute for other traditional operations authenticating a computing device's (or a user's) participation in an information transaction, such as obtaining a signature, requiring entry of a password or code, or requiring an additional user interaction (e.g., "clicking" on a confirmation button).

In block 424, the processor of the first computing device may generate a text string, and may generate an encrypted version of the text string.

In block 426, the first computing device may send the generated text string unencrypted to the second computing device. This transmission may be accomplished by or using any of the communication channels and methods described with reference to the method 300 for similar transmissions.

In block 428, the processor of the first computing device may send the encrypted text string to the third computing device. This transmission may be accomplished by or using any of the communication channels and methods described with reference to the method 300 for similar transmissions.

In block 430, the processor of the third computing device may decrypt the encrypted texturing received from the first communication device.

In block 432, the processor the third computing device may re-encrypt the decrypted text string and may send the re-encrypted text string to the second computing device. This transmission may be accomplished by or using any of the communication channels and methods described with reference to the method 300 for similar transmissions. In various embodiments, the encrypted text string received by the third computing device may be encrypted according to an encryption method or protocol negotiated or agreed to between the first computing device and the third computing device. Further, the third computing device may re-encrypt the text string according to an encryption method or protocol negotiated or agreed to between the second computing device and the third computing device.

In block 434, the processor of the second computing device may decrypt the re-encrypted text string received from the third computing device. In various embodiments, the processor of the second computing device may have now received the unencrypted text string directly from the first computing device, and the re-encrypted first computing device's text string from the third computing device.

In block 436, the processor of the second device may compare the text string from the first computing device and the text string from the third computing device.

In determination block 438, the processor of the second computing device may determine whether the text strings match.

In response to determining that the text strings do not match (i.e., determination block 438="No"), the processor of the second computing device may send an indication that the participation of the first computing device in the information transaction is not authenticated in block 440. This transmission may be accomplished by or using any of the communication channels and methods described with reference to the method 300 for similar transmissions. In some embodiments, the operations of block 440 may include determining that the participation of the first computing device in the information transaction is not authenticated in response to determining that the text strings do not match, and sending the indication that the participation of the first computing device in the information transaction is not authenticated. In some embodiments, the second computing device may store as part of an audit trail the indication that the participation of the first computing device is not authenticated. In some embodiments, the third computing device may store as part of an audit trail the indication that the participation of the first computing device is not authenticated.

In block 442, the processor of the second computing device may prevent the performance of the information transaction. In some embodiments, the processor of the second computing device may prevent the completion of one or more operations of the information transaction.

In response to determining that the text strings match (i.e., determination block 438="Yes"), the processor of the second computing device may send an indication that the participation of the first computing device in the information transaction is authenticated in block 444. This transmission may be accomplished by or using any of the communication channels and methods described with reference to the method 300 for similar transmissions. In some embodiments, the operations of block 444 may include determining that the participation of the first computing device in the information transaction is authenticated in response to determining that the text strings match, and sending the indication that the participation of the first computing device in the information transaction is authenticated. In some embodiments, the second computing device may store as part of an audit trail the indication that the participation of the first computing device is authenticated. In some embodiments, the third computing device may store as part of an audit trail the indication that the participation of the first computing device is authenticated.

In block 446, the processor of the second computing device may enable the performance of the information transaction. In some embodiments, the processor of the second computing device may complete the information transaction.

FIG. 4B illustrates a method 400a of operations executed by the first computing device as part of the method 400. With reference to FIGS. 1A-4D, the method 400a may be implemented by a processor (e.g., the processor 202 and/or the like). In blocks 402, 406, 412, 424, 426, and 428 the processor of the first computing device may perform operations of like numbered blocks of the method 400.

In optional block 445, the processor of the first computing device may receive a confirmation from the second computing device of the correlation of the identifying information to the first computing device account.

In block 447, the processor of the first computing device may receive from the second computing device a request for the first computing device's transitory identity.

In determination block 448, the processor of the first computing device may determine whether a confirmation success indication or a confirmation failure indication is or has been received. In response to determining that a confirmation failure indication is or has been received (i.e., determination block 448="Failure"), in block 450 the processor may stop performing the operations of the methods 400 and 400a.

In response to determining that a confirmation success indication is or has been received (i.e., determination block 448="Success"), the processor may perform the operations of blocks 424-428.

In determination block 452, the processor of the first computing device may determine whether an indication that the first computing device is authenticated or not authenticated is or has been received. In response to determining that the processor receives an indication that the first computing device is not authenticated (i.e., determination block 452="Not authenticated"), the processor may stop performing the operations of the method 400 and 400a in block 454.

In response to determining that the processor receives an indication that the first computing device is authenticated (i.e., determination block 452="Authenticated"), the processor may perform the information transaction in block 456.

FIG. 4C illustrates a method 400b of operations executed by the second computing device as part of the method 400. With reference to FIGS. 1A-4D, the method 400a may be implemented by a processor (e.g., the processor 202 and/or the like). In blocks 404, 408, 410, 414, and 436-442 the processor of the second computing device may perform operations of like numbered blocks of the method 400.

In block 458, the processor of the second computing device may receive information identifying the user account from the first computing device.

In block 459, the processor of the second computing device may receive from the first computing device a request to perform an information transaction.

In block 460, the processor of the second computing device may receive a transitory identity from the first computing device (i.e., the first device's transitory identity).

In determination block 462, the processor of the second computing device may determine whether an indication of confirmation success of the first computing device or confirmation failure of the first computing device is or has been received.

In response to determining that an indication of confirmation failure of the first computing device is or has been received (i.e., determination block 462="Failure"), the processor may stop performing the operations of method 400 and 400b in block 464.

In response to determining that an indication of confirmation success of the first computing device is or has been received (i.e., determination block 462="Success"), the processor may proceed with the information transaction.

In block 466, the processor may receive the unencrypted text string from the first computing device.

In block 468, the processor may receive the re-encrypted text string from the third computing device.

In block 436, the processor of the second computing device may compare the text string from the first computing device and the text string from the third computing device. In various embodiments, the processor of the second computing device may decrypt the re-encrypted text string received from the third computing device. In determination block 438, the processor of the second computing device may determine whether the text strings match (i.e., whether the text string from the first computing device matches the text string from the third computing device).

In response to determining that the text strings do not match (i.e., determination block 438="No"), the processor of the second computing device may send an indication that the participation of the first computing device in the information transaction is not authenticated in block 440.

In block 442, the processor of second computing device may prevent the performance of the information transaction. In some embodiments, the processor of the second computing device may prevent the completion of one or more operations of the information transaction.

In response to determining that the text strings match (i.e., determination block 438="Yes"), the processor of the second computing device may send an indication that the participation of the first computing device in the information transaction is authenticated in block 444.

In block 446, the second computing device may enable the performance of the information transaction. In some embodiments, the second computing device may complete the information transaction.

FIG. 4D illustrates a method 400c of operations executed by the third computing device as part of the method 400. With reference to FIGS. 1A-4D, the method 400c may be implemented by a processor (e.g., the processor 202 and/or the like). In blocks 416-422, 430, 432 the processor of the third computing device may perform operations of like numbered blocks of the method 400.

In block 470, the processor of the third computing device may receive from the first computing device the transitory identity of the first computing device.

In block 472, the processor of the third computing device may receive the first computing device's transitory identity from the second computing device.

In block 416, the processor of the third computing device may compare the transitory identity of the first computing device received from the first computing device and the transitory identity of the first computing device received from the second computing device.

In block 474, the processor the third computing device may receive the encrypted text string from the first computing device.

In determination block 476, the processor of the third computing device may determine whether the participation of the first computing device in the information transaction is authenticated or not authenticated.

In response to determining that the participation of the first computing device in the information transaction is not authenticated (i.e., determination block 476="Not authenticated"), the processor of the third computing device may store an indication of the authentication failure in block 478.

In response to determining that the participation of the first computing device in the information transaction is authenticated (i.e., determination block 476="Authenticated"), the processor of the third computing device may store an indication of the authentication success in block 480.

Figure 5A:
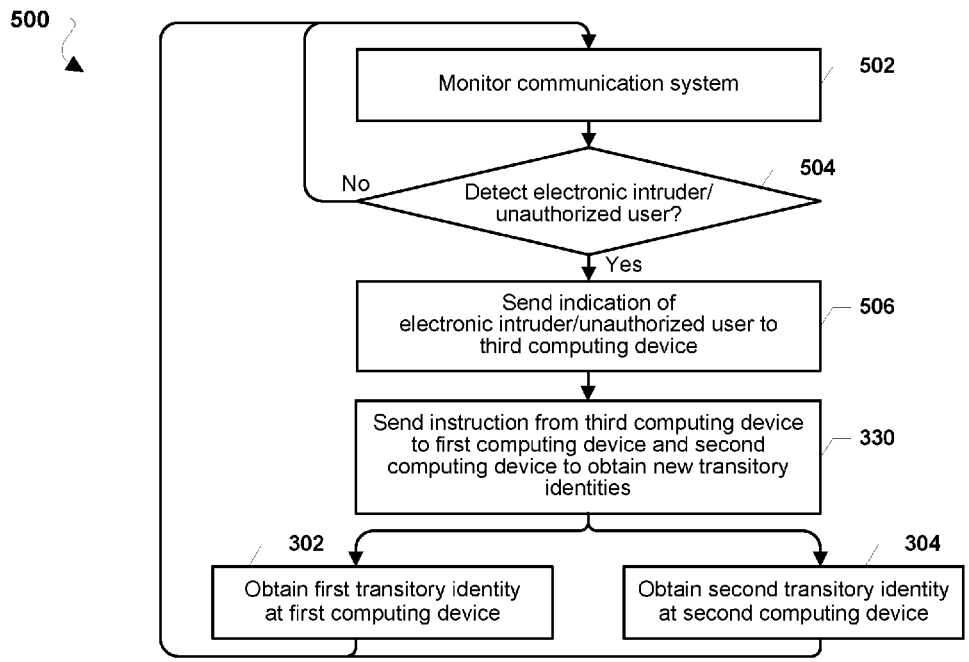
FIG. 5A is a process flow diagram illustrating a method of protecting communications between two computing devices in the event of an intrusion by an unauthorized party according to various embodiments.

FIG. 5A illustrates a method 500 of authenticating a first computing device (e.g., the computing device 102, 104, 184, 186, and 200 of FIGS. 1B-2) with a second computing device (e.g., the computing device 106, 190-196, and 200 of FIGS. 1B-2), and vice versa, through interactions with a third computing device (e.g., 108, 188, and 200 of FIGS. 1B-2) according to some embodiments. With reference to FIGS. 1A-5B, the method 500 may be implemented by a processor (e.g., the processor 202 and/or the like) of the computing device (i.e., a device processor). In blocks 302 and 304 the device processor may perform operations of like-numbered blocks of the method 300.

In block 502, a processor of an electronic security system (e.g., the electronic security system 114) may monitor a communication system. For example, the electronic security system may perform network monitoring, key logging, intrusion detection, traffic analysis, or another operation to perform network monitoring or security functions.

In determination block 502, the processor of the electronic security system may determine whether an electronic intruder or unauthorized user is detected. In response to determining that an electronic intruder or unauthorized user is not detected (i.e., determination block 504="No"), the processor of the electronic security system may continue to monitor the communication system in block 502.

In response to determining that an electronic intruder or unauthorized user is detected (i.e., determination block 504="Yes"), the processor of the electronic security system may send an indication of the electronic intruder or unauthorized user to a third computing device (e.g., the third computing device 108) in block 506.

A processor of the third computing device may receive the indication of the electronic intruder or unauthorized user from the electronic security system. In response to the indication of the electronic intruder or unauthorized user from the electronic security system, the processor of the third computing device may send an instruction to a first computing device (e.g., the computing device 102 and 104) and the second computing device (e.g., the computing device 106) to obtain new transitory identities in block 330. Processors of the first and second computing devices may then perform the operations of blocks 302 and 304.

In some embodiments, the third computing device may send the instructions to the first computing device and the second computing device in the background, transparent to any end user (for example, without the first computing device or the second computing device presenting to a respective user any indication of receiving the instruction from the third computing device). In such embodiments, based on the detection of the electronic intruder or unauthorized user, the third computing device may instruct the first and second computing devices, as well as any other computing devices participating in the system, to obtain a new transitory identity and thus perform a "global reset" that may block the intruder or unauthorized user from accessing the communication system. In various embodiments, the speed at which the third computing device may send the instruction to obtain new transitory identities to various computing devices, and at which of the various computing devices may obtain a respective new transitory identity, may be limited only by the operating speed of each computing device and any network communication delay (e.g., communication latency). An amount of time required for sending the instructions to the first and second computing devices and for the first and second computing devices to obtain new transitory identities is thus shorter than, for example, an amount of time required for a conventional certificate authority to issue new certificates to all participating users. Further, the method 500 does not require manual operations by a user of the first or second computing device, such as a password reset. Indeed, as described above, a user of the first or second computing device may continue to use existing credentials, such as a username and password—even after a security breach—because the existing credentials may be used to identify the user but not be used for authentication purposes.

In some embodiments, the electronic security system may be configured to receive a command or an indication that a computing device should be de-authorized from access to the communication system. For example, the electronic security system may be a component or an element of a network authorization system, or a human resources system, or a system that provides a list of authorized users of the communication system, or another similar system. In such embodiments, the electronic security system may receive a command or another message indicating that an authorization of a computing device should be removed or blocked. In some embodiments, in response to receiving an indication that an unauthorized user or electronic intruder has been detected, that a computing device authorization should be removed or blocked, or another similar indication, the third computing device may send an instruction to the first computing device and/or the second computing device to obtain a new transitory identity.

Figure 5B:
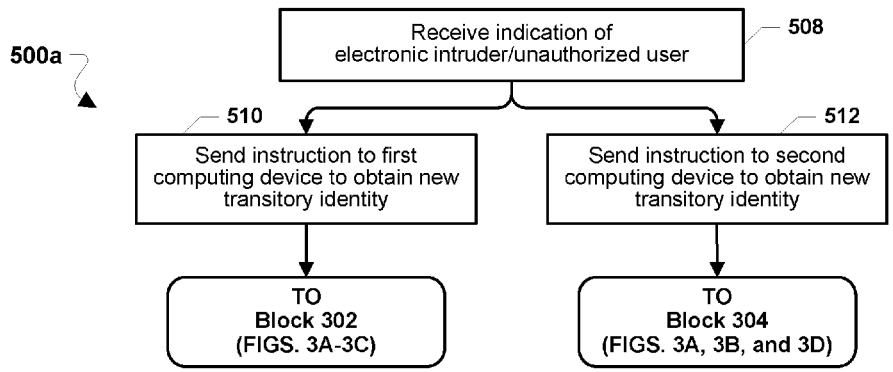
FIG. 5B illustrates a method 500a of operations executed by the third computing device as part of the method 500.

FIG. 5B illustrates a method 500*a* of operations executed by the third computing device as part of the method 500. With reference to FIGS. 1A-5B, the method 500*a* may be implemented by a processor (e.g., the processor 202 and/or the like).

In block 508, the processor of the third computing device may receive from the electronic security system an indication of the electronic intruder or unauthorized user.

In block 510, the processor of the third computing device may send an instruction to the first computing device (e.g., the computing device 102 and 104) to obtain a new transitory identity. The processor of the first computing device may proceed to block 302 of the method 300 (FIGS. 3A-3C).

In block 512, the processor of the third computing device may send an instruction to the second computing device (e.g., the computing device 106) to obtain a new transitory identity. The processor of the second computing device may proceed to block 304 of the method 300 (FIGS. 3A, 3B, and 3D).

Figure 6A:
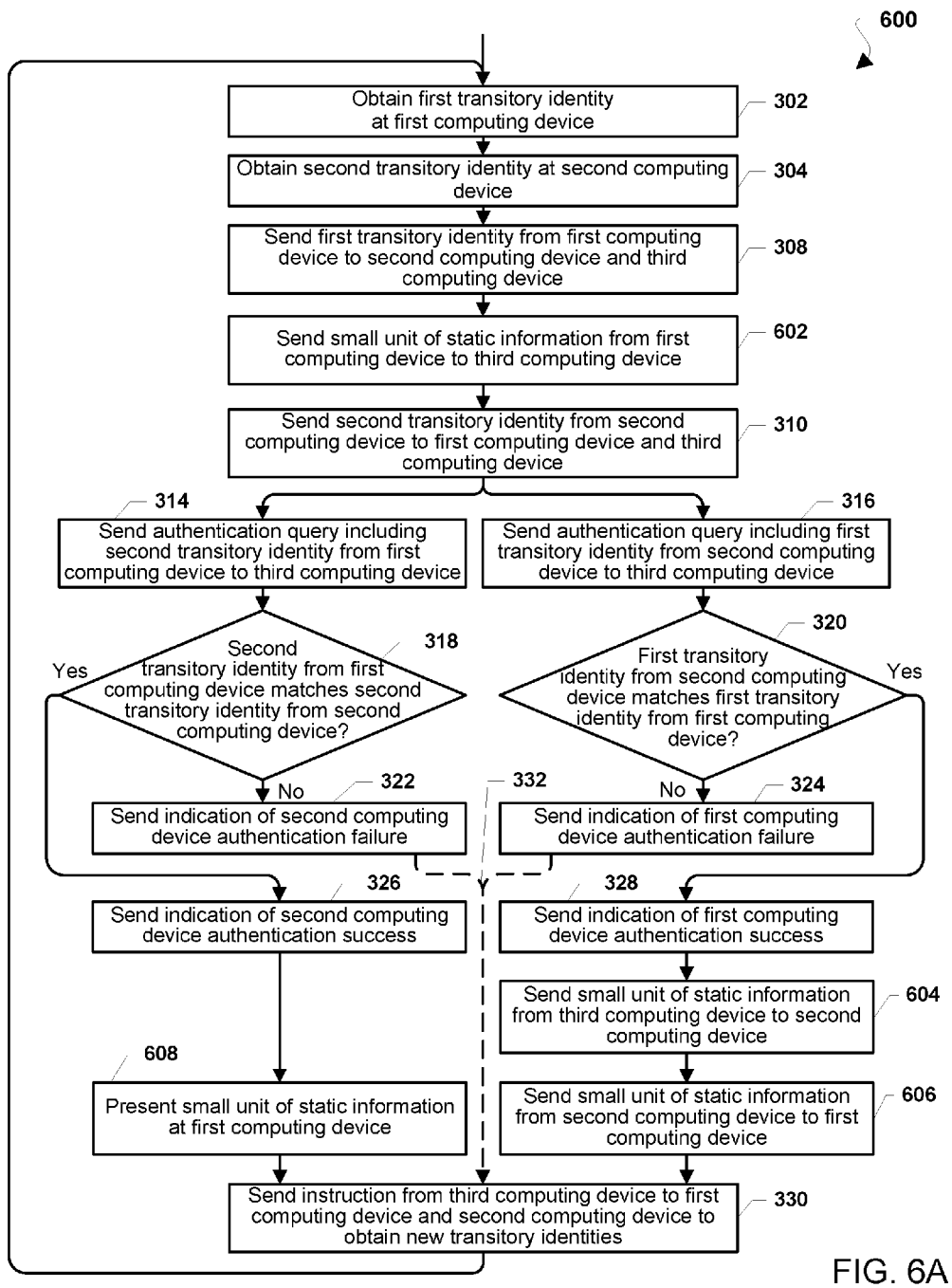
FIG. 6A is a process flow diagram illustrating a method of authenticating one computing device to another computing device according to various embodiments.
Figure 6B:
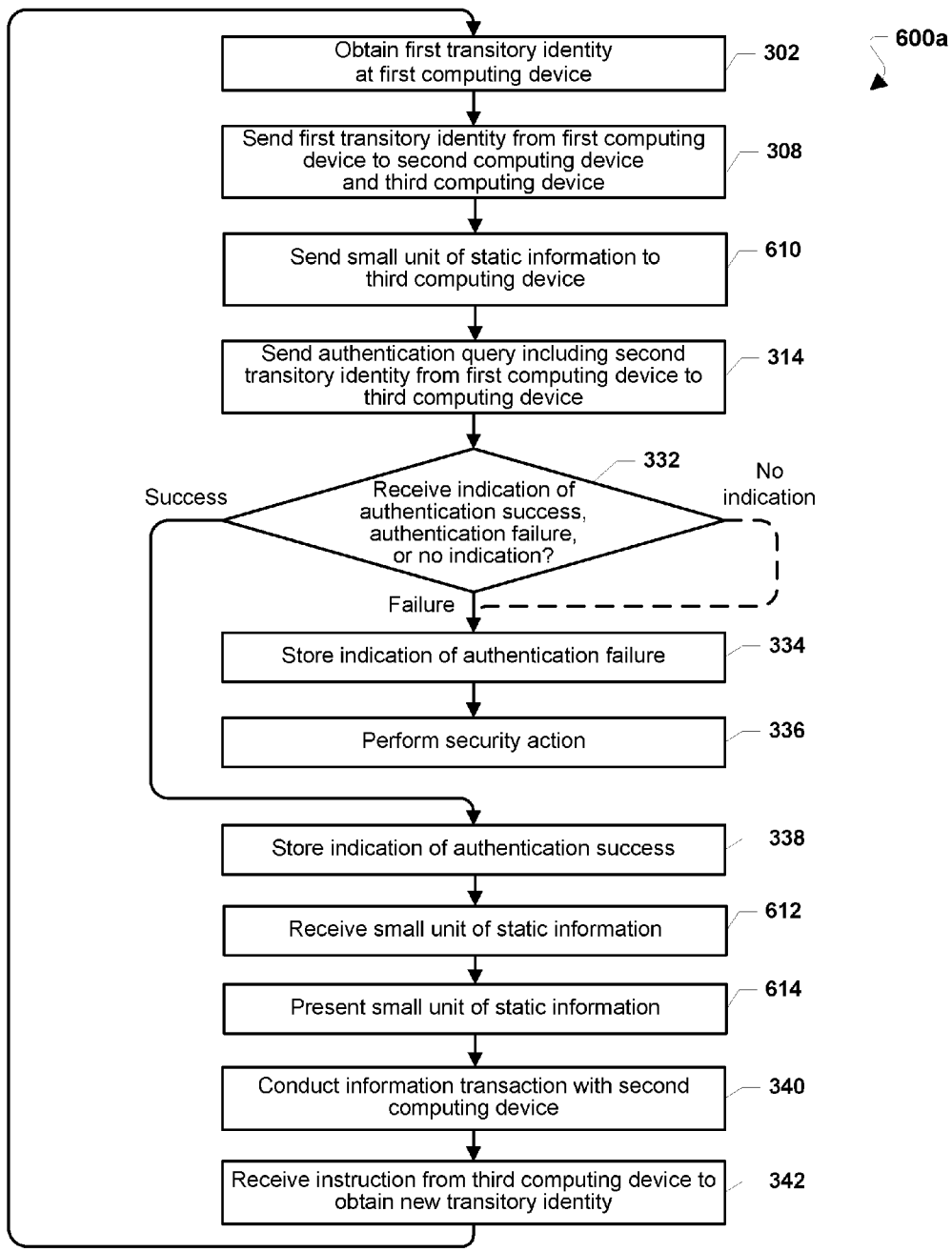
FIG. 6B illustrates a method 600a of operations executed by the first computing device as part of the method 600.
Figure 6C:
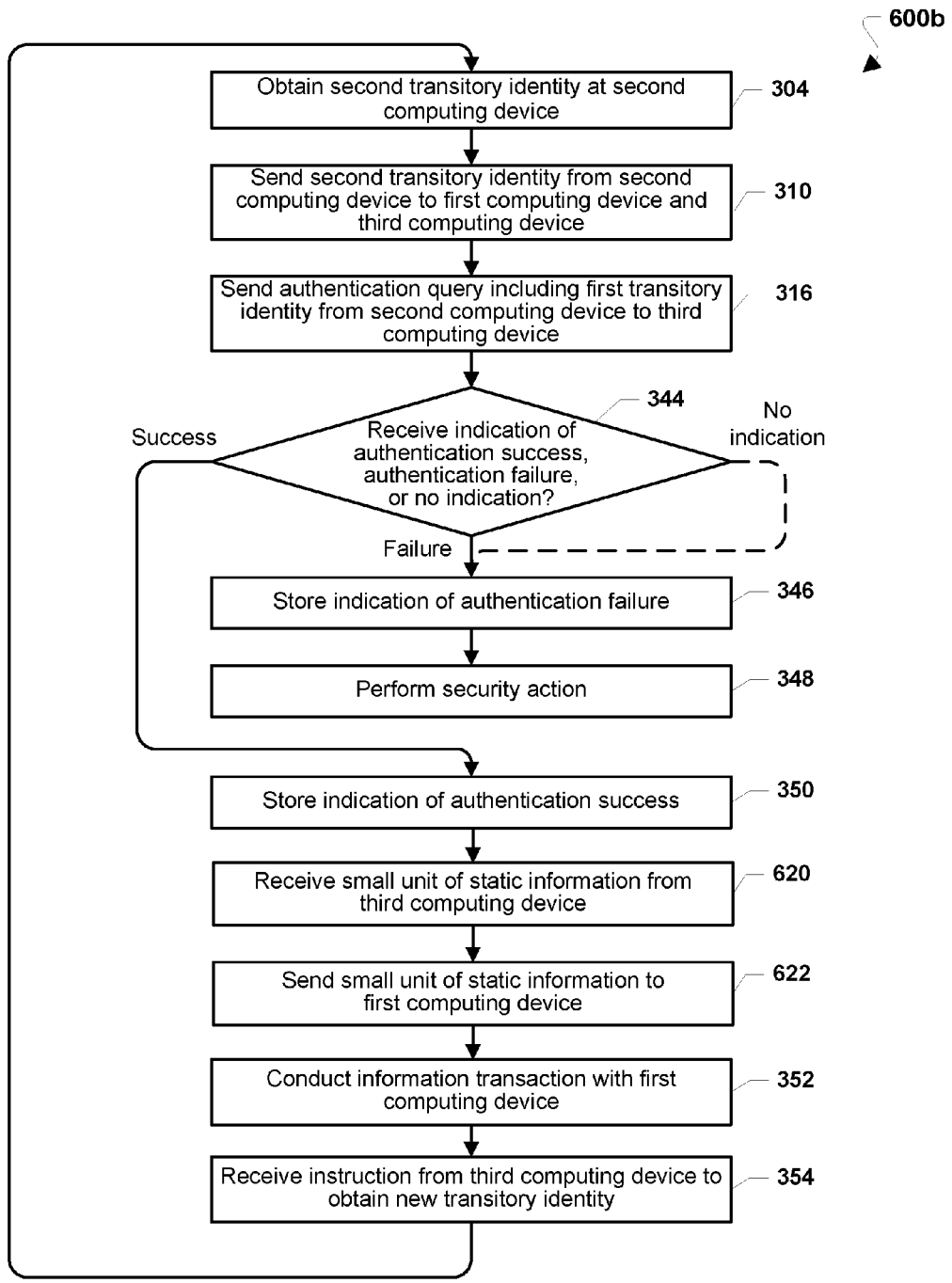
FIG. 6C illustrates a method 600b of operations executed by the second computing device as part of the method 600.
Figure 6D:
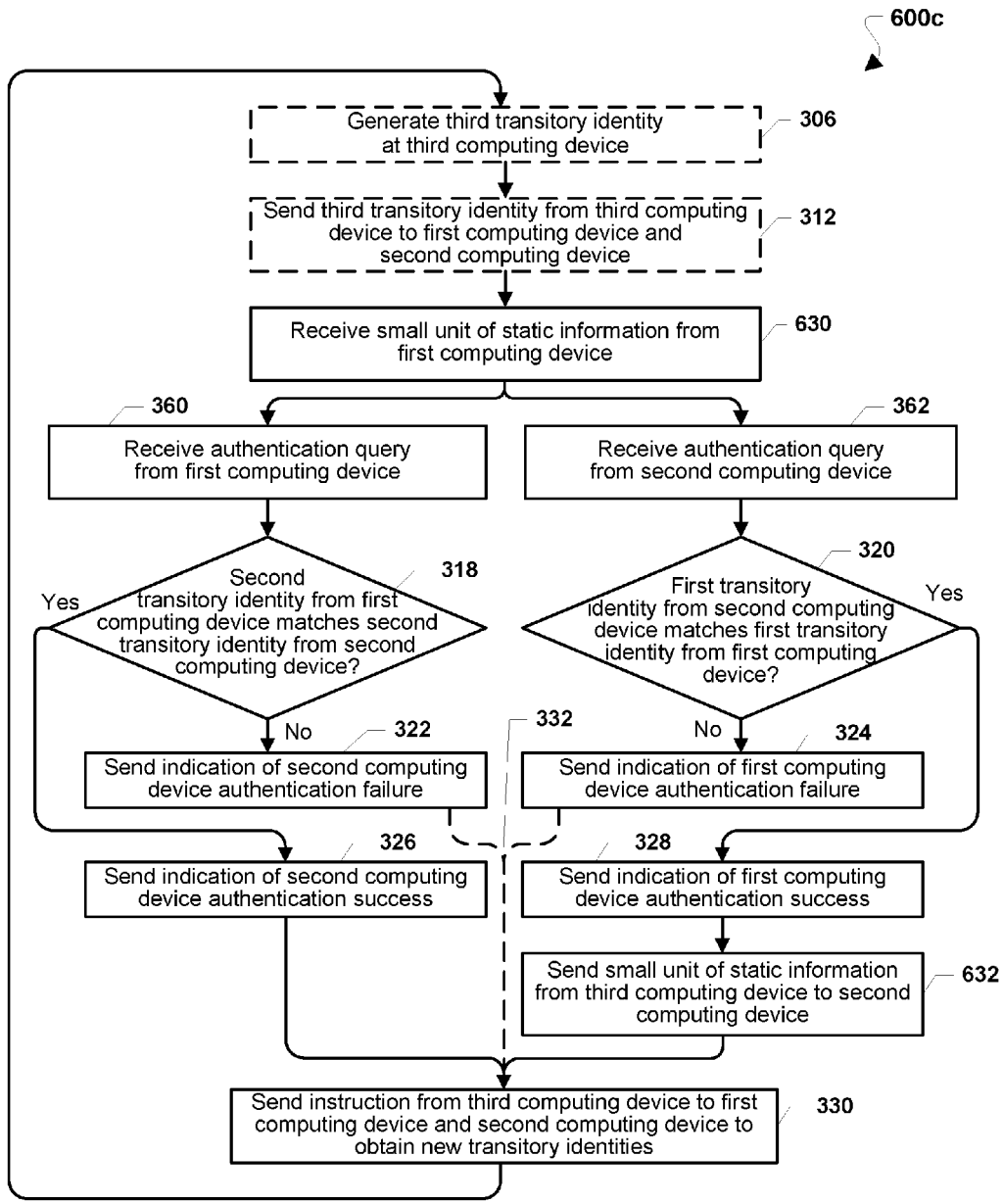
FIG. 6D illustrates a method 600c of operations executed by the third computing device as part of the method 600.

FIG. 6A illustrates a method 600 of authenticating a first computing device (e.g., the computing device 102, 104, 184, 186, and 200 of FIGS. 1B-2) to a second computing device (e.g., the computing device 106, 190-196, and 200 of FIGS. 1B-2), and vice versa, through interactions with a third computing device (e.g., 108, 188, and 200 of FIGS. 1B-2) according to some embodiments. FIG. 6B illustrates a method 600*a* of operations executed by a processor of the first computing device as part of the method 600. FIG. 6C illustrates a method 600*b* of operations executed by a processor of the second computing device as part of the method 600. FIG. 6D illustrates a method 600c of operations executed by a processor of the third computing device as part of the method 600.

In block 602, the processor of the first computing device may send the small unit of static information to the third computing device. The small unit of static information may include a human-perceivable indicator such as, for example, an image, an icon, a sound, a rhythm or rhythmic pattern, haptic feedback instructions, or another similar unit of information that may be presented by a computing device.

In block 604, the processor of the third computing device may send the small unit of static information to the second computing device. The third computing device may send the small unit of static information together with, in parallel with, before, or after, the indication of the authentication success of the first computing device that the third computing device may send to the second computing device in block 328.

In block 606, the processor of the second computing device may send the small unit of static information to the first computing device.

In block 608, processor of the first computing device may present the small unit of static information. In some embodiments, presenting the small unit of static information may include presenting a human-perceivable indication, instructions for which are included in the small unit of static information. The human-perceivable indication may include a picture (such as an image, icon, emoji, etc.), a sound (such as music, an alert noise, a rhythm or rhythmic pattern, etc.), a vibration (such as by a haptic feedback device), or another human-perceivable indication. In some embodiments, presenting the small unit of static information may include a combination of two or more of the foregoing. In some embodiments, the small unit of static information may be selected by, created by, or personalized by a user of the first computing device such that the small unit of static information is readily recognizable when presented by the first computing device.

The presentation of the human-perceivable indication may provide a readily perceived indication that the second computing device received the small unit of static information from the third computing device. Thus, the presentation of the human-perceivable indication by the first computing device may provide an additional indication to the first computing device of the identity of the second computing device, by verifying the receipt of the small unit of static information by the second computing device from the third computing device.

In some embodiments, the second computing device may receive the small unit of static information from the third computing device, and the second computing device may send the small unit of static information directly to the first computing device to indicate that the second computing device is an authenticated participant in the communication. The third computing device, having received the small image from the first computing device, and having authenticated the second computing device, may send the small image to the second computing device. The second computing device may then send the image to the first computing device, for example, to be displayed by the first computing device to provide a visual indication of the authentication of the second computing device. In various embodiments, the use of such a small unit of static information to provide an indication of the authentication of the second computing device may aid in mitigating, among other things, spear phishing attacks, man-in-the-middle attacks, and other similar communication attacks involving interception of communication or impersonation of a computing device.

For example, in the performance of an electronic commerce ("e-commerce") transaction, an e-commerce server may receive from the third computing device (e.g., functioning as an authentication server) a small image file received by the third computing device from the first computing device (e.g., a user device). The e-commerce server may then send the small image file to the first computing device to be included in the website of the e-commerce service, or to provide some other visual indication displayed on the first computing device of the authentication of the second computing device. The image encoded by the small image file may be personalized by, and thus readily recognized by, a user of the first computing device. Thus, whereas some conventional systems use a simple visual indication that a network service is secure (e.g., the SSL "padlock" icon), the actual authentication of the network service may be difficult or impossible to verify. Further, the simple visual indication is typically generic such that the simple visual indication is easy to copy and use in a fake or malicious services, such as a phishing site. The presentation of the small static unit of information in various embodiments represents an improvement over current security system by providing a readily perceived and personalized indication that the second computing device received the small unit of static information from the third computing device. This provides an additional indication to a user of the first computing device that the second computing device is or has been authenticated by the third computing device.

FIG. 6B illustrates a method 600a of operations executed by the first computing device as part of the method 600. With reference to FIGS. 1A-6D, the method 600a may be implemented by a processor (e.g., the processor 202 and/or the like). In blocks 302, 308, 314, 332-338, 340, and optional block 342 the processor of the first computing device may perform operations of like numbered blocks of the methods 300 and 300a.

In block 610, the processor of the first computing device may send the small unit of static information to the third computing device.

In block 612, the processor of the first computing device may receive the small unit of static information.

In block 614, the processor of the first computing device may present the small unit of static information. The processor of the first computing device may then perform the operations of block 340 and optional block 342 as described.

FIG. 6C illustrates a method 600b of operations executed by the second computing device as part of the method 600. With reference to FIGS. 1A-6D, the method 600b may be implemented by a processor (e.g., the processor 202 and/or the like). In blocks 304, 310, 316, 344-350, 352, and optional block 354 the processor of the second computing device may perform operations of like numbered blocks of the methods 300 and 300b.

In block 620, the processor of the second computing device may receive the small unit of static information from the third computing device.

In block 622, the processor of the second computing device may send the small unit of static information to the first computing device. The processor may then perform the operations of block 352 and optional block 354 as described.

FIG. 6D illustrates a method 600c of operations executed by the third computing device as part of the method 600. With reference to FIGS. 1A-6D, the method 600c may be implemented by a processor (e.g., the processor 202 and/or the like). In blocks 306, 312, 318-330, 360, and 362 the processor of the third computing device may perform operations of like numbered blocks of the methods 300 and 300d.

In block 630, the processor of the third computing device may receive the small unit of static information from the first computing device.

In block 632, the processor of the third computing device may send the small unit of static information from the third computing device to the second computing device.

Various embodiments provide a system that may authenticate the identity of the computing device in a communication system based on dynamic information of each computing device, in contrast to the current paradigm of shared secrets and static information. Various embodiments improve the operation of each participating computing device by dramatically improving the security of communications among the participating computing devices. Further, because the transitory identity of each computing device changes periodically, and each computing device is in periodic communication with other computing devices sending and/or receiving new transitory identities, various embodiments improve the function of a communication network or an electronic communication system by improving the security of communications. Various embodiments also improve the function of any communication network by reliably authenticating the identity of a participating computing device without relying on static identification information, such as a shared secret, that may be vulnerable to attack by access and/or copying.

Various embodiments may improve the function of each participating computing device, as well as the overall communication system, by enabling the authentication of the participating communication devices. Various embodiments improve the function of each participating computing device in a wide range of communications and/or information transaction contexts, including healthcare record management, secure communications (e.g., government, business, intelligence community, etc.), public records management systems, voting systems, financial services systems, security brokerage systems, and many others. Various embodiments may also improve the function of the Internet of Things, and communication among various IoT devices or among IoT devices and an IoT device controller, such as a router, server, IoT hub, or another similar device. In particular, various embodiments, when implemented in an IoT environment, may be of particular use in preventing distributed denial of service (DDoS) attacks, without human intervention. Various embodiments may improve the function of a communication system by enabling the performance of a non-repudiable information transaction in which, because the participation of specific computing devices may be authenticated, the authentication procedure may generate evidence creating a presumption that a participant actually participated in the information transaction.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 300a, 300b, 300c, 400, 400a. 400b. 400c, 500, 500a, 600, 600a, 600b, and 600c may be substituted for or combined with one or more operations of the methods 300, 300a, 300b, 300c, 400, 400a. 400b. 400c, 500, 500a, 600, 600a, 600b, and 600c.

Figure 7:
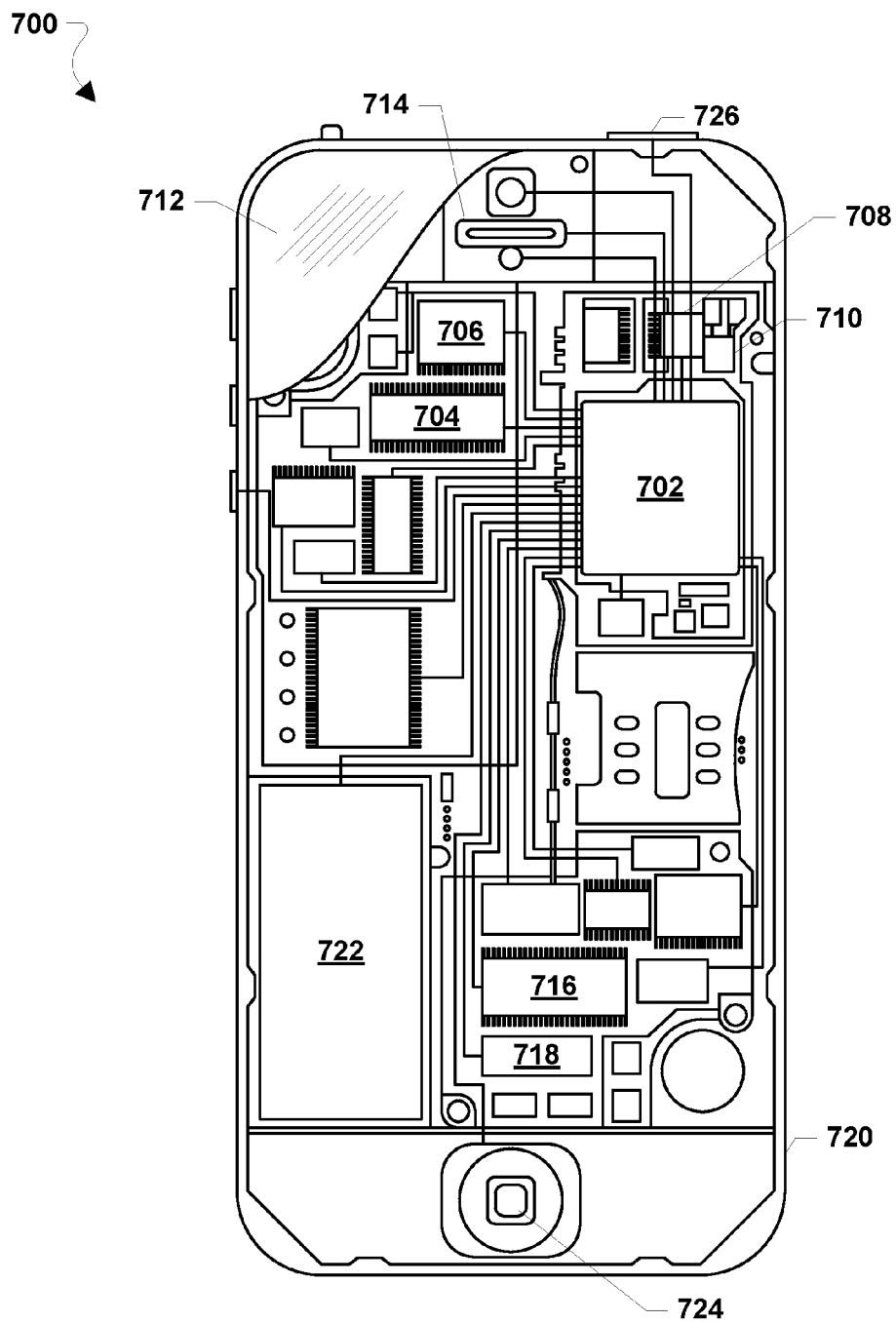
FIG. 7 is a component block diagram of a mobile wireless computing device suitable for implementing various embodiments.
Figure 8:
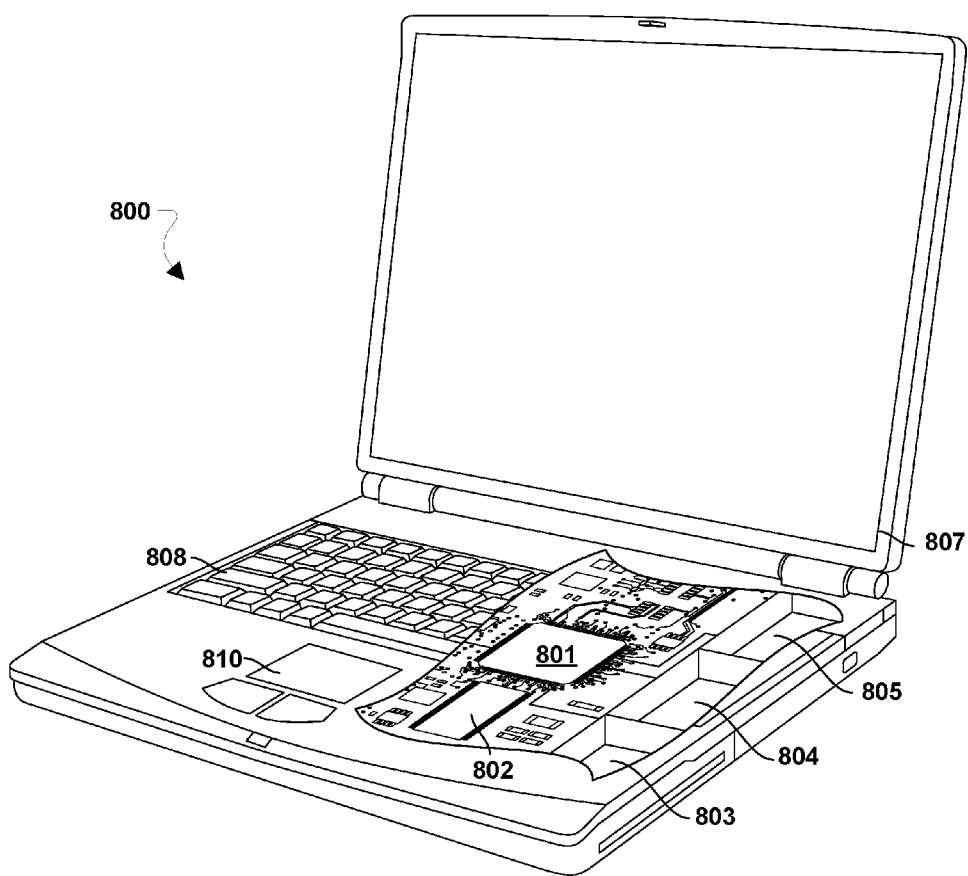
FIG. 8 is a component block diagram of a portable wireless communication device suitable for implementing various embodiments.
Figure 9:
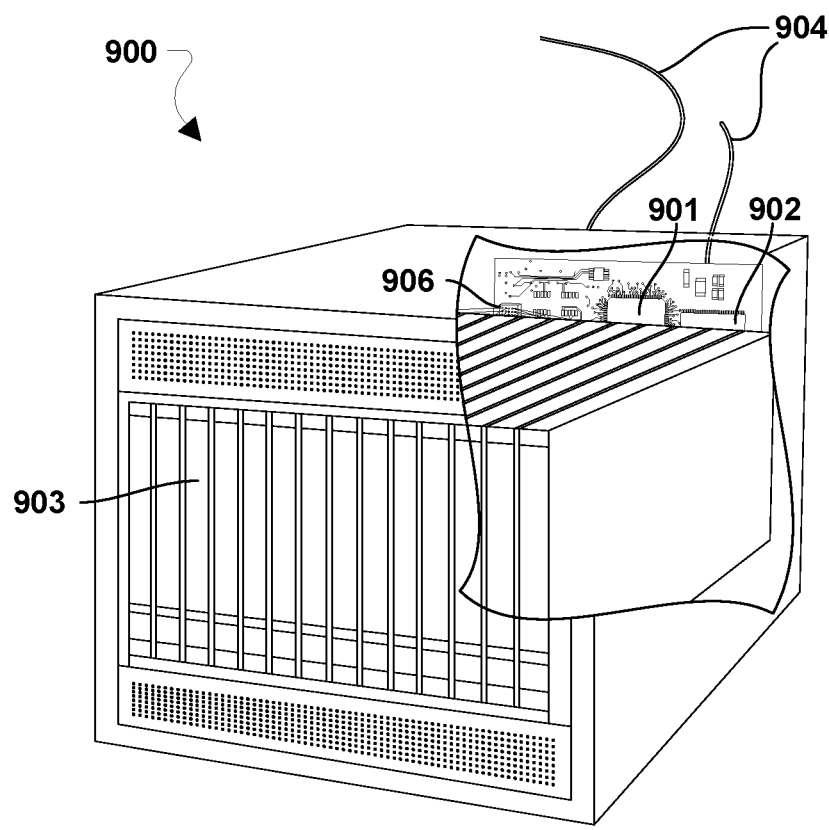
FIG. 9 is a component block diagram of a server device suitable for implementing various embodiments.

FIG. 7 is a component block diagram of a mobile wireless communication device 700 suitable for implementing various embodiments. With reference to FIGS. 1A-7, the mobile wireless communication device 700 may include a processor 702 coupled to a touchscreen controller 706 and an internal memory 704. The processor 702 may be one or more multi-core integrated circuits designated for general or specific processing tasks. The internal memory 704 may be volatile or non-volatile memory, and may also be secure and/or encrypted memory, or unsecure and/or unencrypted memory, or any combination thereof. The touchscreen controller 706 and the processor 702 may also be coupled to a touchscreen panel 712, such as a resistive-sensing touchscreen, capacitive-sensing touchscreen, infrared sensing touchscreen, etc. Additionally, the display of the mobile wireless communication device 700 need not have touch screen capability.

The mobile wireless communication device 700 may have two or more radio signal transceivers 708 (e.g., Peanut, Bluetooth, Zigbee, Wi-Fi, radio frequency (RF), etc.) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile wireless communication device 700 may include one or more cellular network wireless modem chip(s) 716 coupled to the processor and antennae 710 that enables communication via two or more cellular networks via two or more radio access technologies.

The mobile wireless communication device 700 may include a peripheral wireless device connection interface 718 coupled to the processor 702. The peripheral wireless device connection interface 718 may be singularly configured to accept one type of connection, or may be configured to accept various types of physical and communication connections, common or proprietary, such as USB, FireWire, Thunderbolt, or PCIe. The peripheral wireless device connection interface 718 may also be coupled to a similarly configured peripheral wireless device connection port (not shown).

The mobile wireless communication device 700 may also include speakers 714 for providing audio outputs. The mobile wireless communication device 700 may also include a housing 720, constructed of a plastic, metal, or a combination of materials, for containing all or some of the components discussed herein. The mobile wireless communication device 700 may include a power source 722 coupled to the processor 702, such as a disposable or rechargeable battery. The rechargeable battery may also be coupled to the peripheral wireless device connection port to receive a charging current from a source external to the mobile wireless communication device 700. The mobile wireless communication device 700 may also include a physical button 724 for receiving user inputs. The mobile wireless communication device 700 may also include a power button 726 for turning the mobile wireless communication device 700 on and off.

Other forms of computing devices may also benefit from the various aspects. Such computing devices typically include the components illustrated in FIG. 8, which illustrates an example laptop computer 800. With reference to FIGS. 1A-8, the computer 800 generally includes a processor 801 coupled to volatile memory 802 and a large capacity nonvolatile memory, such as a disk drive 803. The computer 800 may also include a compact disc (CD) and/or DVD drive 804 coupled to the processor 801. The computer 800 may also include a number of connector ports coupled to the processor 801 for establishing data connections or receiving external memory devices, such as a network connection circuit 805 for coupling the processor 801 to a network. The computer 800 may also include a display 807, a keyboard 808, a pointing device such as a trackpad 810, and other similar devices.

Various embodiments may employ a computing device as a network element of a communication network. Such network elements may typically include at least the components illustrated in FIG. 9, which illustrates an example network element, server device 900. With reference to FIGS. 1A-9, the server device 900 may typically include a processor 901 coupled to volatile memory 902 and a large capacity nonvolatile memory, such as a disk drive 903. The server device 900 may also include a peripheral memory access device such as a floppy disc drive, compact disc (CD) or digital video disc (DVD) drive 906 coupled to the processor 901. The server device 900 may also include network access ports 904 (or interfaces) coupled to the processor 901 for establishing data connections with a network, such as the Internet and/or a local area network coupled to other system computers and servers. Similarly, the server device 900 may include additional access ports, such as USB, Firewire, Thunderbolt, and the like for coupling to peripherals, external memory, or other devices.

The processors 702, 801, 901 may be any programmable microprocessor, microcomputer or multiple processor chip or chips that can be configured by software instructions (applications) to perform a variety of functions, including the functions of the various aspects described below. In some mobile devices, multiple processors 702 may be provided, such as one processor dedicated to wireless communication functions and one processor dedicated to running other applications. Typically, software applications may be stored in the internal memory 704, 802, 902 before they are accessed and loaded into the processor 702, 801, 901. The processor 702, 801, 901 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art, the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A system for authenticating a first computing device to a second computing device through interaction with a third computing device, comprising:
   the first computing device, comprising:
      a first communication interface; and
      a first processor coupled to the communication interface and configured with processor-executable instructions to perform operations comprising:
         obtaining an ephemeral first transitory identity at the first computing device;
         sending the first transitory identity to the second computing device and to the third computing device;
         receiving an ephemeral second transitory identity from the second computing device;
         sending a first authentication query including the second transitory identity to the third computing device; and
         receiving from the third computing device an indication of whether the second computing device is authenticated;
   the second computing device, comprising:
      a second communication interface; and
      a second processor coupled to the communication interface and configured with processor-executable instructions to perform operations comprising:
         obtaining the second transitory identity at the second computing device;
         sending the second transitory identity to the first computing device and to the third computing device;
         receiving the first transitory identity from the first computing device;
         sending a second authentication query including the first transitory identity to the third computing device; and
         receiving from the third computing device an indication of whether the first computing device is authenticated; and
   the third computing device, comprising:
      a third communication interface; and
      a third processor coupled to the communication interface and configured with processor-executable instructions to perform operations comprising:
         receiving the first transitory identity from the first computing device;
         receiving the second authentication query;
         determining whether the first transitory identity from the first computing device matches the first transitory identity from the second computing device;
         sending to the second computing device the indication of whether the first computing device is authenticated based on the determination of whether the first transitory identity from the first computing device matches the first transitory identity from the second computing device;
         receiving the second transitory identity from the second computing device;
         receiving the first authentication query;
         determining whether the second transitory identity from the first computing device matches the second transitory identity from the second computing device; and
         sending to the first computing device an indication of whether the second computing device is authenticated based on the determination of whether the second transitory identity from the first computing device matches the second transitory identity from the second computing device.

2. The system of claim 1, wherein the processor of the third computing device is configured with processor-executable instructions to perform operations further comprising:
   sending an instruction to each of the first computing device and the second computing device to obtain an ephemeral new transitory identity.

3. The system of claim 2, wherein the processor of the third computing device is configured with processor-executable instructions to perform operations such that sending the instruction to each of the first computing device and the second computing device to obtain the new transitory identity comprises:
   sending the instruction to each of the first computing device and the second computing device to obtain the new transitory identity in response to determining that the first transitory identity from the second computing device does not match the first transitory identity from the first computing device.

4. The system of claim 2, wherein the processor of the third computing device is configured with processor-executable instructions to perform operations such that sending the instruction to each of the first computing device and the second computing device to obtain the new transitory identity comprises:
   sending the instruction to each of the first computing device and the second computing device to obtain the new transitory identity in response to determining that the second transitory identity from the first computing device does not match the second transitory identity from the second computing device.

5. The system of claim 1, wherein each of the processor of the first computing device, the processor of the second computing device, and the processor of the third computing device is configured with processor-executable instructions to repeat their respective operations at a frequency that is less than a determined time interval required for an attacker to obtain and use the first and second transitory identities.

6. The system of claim 1, wherein each of the processor of the first computing device, the processor of the second computing device, and the processor of the third computing device is configured with processor-executable instructions to repeat their respective operations at a frequency that is less than a determined time required by an attacker to obtain and use the first, second, and third transitory identities.

7. The system of claim 1, wherein the processor of the first computing device is configured with processor-executable instructions to perform operations further comprising:
   generating a text string and generating an encrypted version of the text string;
   sending the generated text string to the second computing device;
   sending the generated encrypted text string to the third computing device; and
   receiving from the second computing device an indication of whether the first computing device is authenticated based on the text string sent to the second computing device and the encrypted text string sent to the third computing device.

8. The system of claim 7, wherein the processor of the first computing device is configured with processor-executable instructions to perform operations further comprising:
   performing an information transaction with the second computing device in response to receiving from the second computing device an indication that the first computing device is authenticated.

9. The system of claim 7, wherein the processor of the third computing device is configured with processor-executable instructions to perform operations further comprising:
   decrypting the encrypted text string from the first computing device; and
   re-encrypting the decrypted text string and sending the re-encrypted text string to the second computing device to enable the second computing device to compare the re-encrypted text string and the text string sent from the first computing device to the second computing device.

10. The system of claim 7, wherein the processor of the second computing device is configured with processor-executable instructions to perform operations further comprising:
    receiving the text string from the first computing device;
    receiving a re-encrypted text string from the third computing device;
    determining whether the text string from the first computing device and the re-encrypted text string from the third computing device match; and
    sending to one or more of the first computing device and the third computing device an indication of whether a participation of the first computing device is authenticated in response to the determining whether the text string from the first computing device and the re-encrypted text string from the third computing device match.

11. The system of claim 10, wherein the processor of the third computing device is configured with processor-executable instructions to perform operations further comprising:
    receiving the indication of whether the participation of the first computing device is authenticated; and
    storing the indication of whether the participation of the first computing device is authenticated.

12. The system of claim 1, wherein the processor of the first computing device is configured with processor-executable instructions to perform operations further comprising:
    sending a unit of static information to the third computing device;
    receiving from the second computing device the unit of static information based on the determination that the first transitory identity from the second computing device matches the first transitory identity from the first computing device; and
    presenting the unit of static information at the first computing device.

13. The system of claim 12, wherein the processor of the first computing device is configured with processor-executable instructions to perform operations such that the unit of static information includes a human-perceivable indicator.

14. The system of claim 1, wherein the processor of the second computing device is configured with processor-executable instructions to perform operations further comprising:
    receiving from the third computing device a unit of static information from the first computing device; and
    sending to the first computing device the unit of static information based on the determination that the first transitory identity from the second computing device matches the first transitory identity from the first computing device.

15. The system of claim 1, wherein the processor of the third computing device is configured with processor-executable instructions to perform operations further comprising:
    receiving a unit of static information from the first computing device; and
    sending to second computing device the unit of static information based on the determination that the first transitory identity from the second computing device matches the first transitory identity from the first computing device.

16. A first computing device, comprising:
    a communication interface; and
    a processor coupled to the communication interface and configured with processor-executable instructions to perform operations comprising:
      obtaining an ephemeral first transitory identity;
      sending the first transitory identity to a second computing device and to a third computing device;
      receiving an ephemeral second transitory identity from the second computing device;
      sending an authentication query including the second transitory identity to the third computing device;
      determining whether an indication of authentication success or an indication of authentication failure is received from the third computing device; and
      performing an information transaction with the second computing device in response to determining that an indication of authentication success is received,
    wherein the processor is further configured with processor-executable instructions to repeat the operations at a frequency that is less than a determined time interval required for an attacker to obtain and use the first and second transitory identities.

17. The first computing device of claim 16, wherein the processor is configured with processor-executable instructions to perform operations further comprising:
    receiving an instruction from the third computing device to obtain a new transitory identity; and
    obtaining an ephemeral new first transitory identity based on the instruction.

18. The first computing device of claim 16, wherein the processor is configured with processor-executable instructions to perform operations further comprising:
    determining that a duration of the first transitory identity has expired; and
    obtaining an ephemeral new first transitory identity based on the determining that the duration of the first transitory identity has expired.

19. The first computing device of claim 16, wherein the processor is configured with processor-executable instructions to perform operations further comprising:

performing a security action in response to determining that an indication of authentication failure is received.

20. The first computing device of claim 16, wherein the processor of the first computing device is configured with processor-executable instructions to perform operations further comprising:
sending to the second computing device a request to perform an information transaction;
receiving from the second computing device an indication of whether the first computing device is authenticated; and
performing the information transaction in response to receiving an indication that the first computing device is authenticated.

21. The first computing device of claim 20, wherein the processor of the first computing device is configured with processor-executable instructions to perform operations further comprising:
receiving a request from the second computing device for the first transitory identity based on the request to perform the information transaction,
wherein sending the first transitory identity to the second computing device and to the third computing device is based on the request from the second computing device for the first transitory identity.

22. The first computing device of claim 20, wherein the processor of the first computing device is configured with processor-executable instructions to perform operations further comprising:
generating a text string and generating an encrypted version of the text string;
sending the generated text string to the second computing device;
sending the generated encrypted text string to the third computing device; and
receiving from the second computing device the indication of whether the first computing device is authenticated based on the text string sent to the second computing device and the encrypted text string sent to the third computing device.

23. A computing device, comprising:
a communication interface; and
a processor coupled to the communication interface and configured with processor-executable instructions to perform operations comprising:
receiving from a first other computing device a request to perform an information transaction;
receiving from the first other computing device an ephemeral transitory identity of the first other computing device;
sending a request comprising the transitory identity to a second other computing device to confirm an identity of the first other computing device;
receiving from the second other computing device an indication of whether the identity of the first other computing device is confirmed; and
sending an indication of whether performance of the information transaction is enabled based on the indication of whether the identity of the first other computing device is confirmed,
wherein the processor is further configured with processor-executable instructions to repeat the operations at a frequency that is less than a determined time interval required for an attacker to obtain and use the transitory identity.

24. The computing device of claim 23, wherein the processor is configured with processor-executable instructions to perform operations further comprising:
sending a request to the first other computing device for a transitory identity of the first other computing device based on the request to perform the information transaction.

25. The computing device of claim 23, wherein the processor is configured with processor-executable instructions to perform operations further comprising:
receiving a text string from the first other computing device;
receiving a re-encrypted text string from the second other computing device;
determining whether the text string from the first other computing device and the re-encrypted text string from the second other computing device match; and
sending to one or more of the first other computing device and the second other computing device an indication of whether a participation of the first other computing device is authenticated in response to the determining whether the text string from the first other computing device and the re-encrypted text string from the second other computing device match.

26. The computing device of claim 25, wherein the processor is configured with processor-executable instructions to perform operations further comprising:
enabling performance of the information transaction based on the determination that the text string from the first other computing device and the re-encrypted text string from the second other computing device match.

27. A computing device configured to communicate with a first other computing device and a second other computing device, comprising:
a communication interface; and
a processor coupled to the communication interface and configured with processor-executable instructions to perform operations comprising:
receiving an ephemeral first transitory identity from the first other computing device;
receiving an authentication query comprising the first transitory identity from the second other computing device;
determining whether the first transitory identity from the first other computing device matches the first transitory identity from the second other computing device; and
sending to the second other computing device an indication of whether the first other computing device is authenticated based on the determination of whether the first transitory identity from the first other computing device matches the first transitory identity from the second other computing device,
wherein the processor is further configured with processor-executable instructions to repeat the operations at a frequency that is less than a determined time interval required for an attacker to obtain and use the first transitory identity.

28. The computing device of claim 27, wherein the processor is configured with processor-executable instructions to perform operations further comprising:
receiving an ephemeral second transitory identity from the second other computing device;
receiving an authentication query comprising the second transitory identity from the first other computing device;

determining whether the second transitory identity from the second other computing device matches the second transitory identity from the first other computing device; and sending to the first other computing device an indication of whether the second other computing device is authenticated based on the determination of whether the second transitory identity from the second other computing device matches the second transitory identity from the first other computing device.

29. The computing device of claim 28, wherein the processor is configured with processor-executable instructions to perform operations further comprising:
sending to the first other computing device an indication of authentication success of the second other computing device in response to determining that the second transitory identity from the second other computing device matches the second transitory identity from the first other computing device.

30. The computing device of claim 28, wherein the processor is configured with processor-executable instructions to perform operations further comprising:
sending to the first other computing device an indication of authentication failure of the second other computing device in response to determining that the second transitory identity from the second other computing device does not match the second transitory identity from the first other computing device.

31. The computing device of claim 27, wherein the processor is configured with processor-executable instructions to perform operations further comprising:
sending to the second other computing device an indication of authentication success of the first other computing device in response to determining that the first transitory identity from the first other computing device matches the first transitory identity from the second other computing device.

32. The computing device of claim 27, wherein the processor is configured with processor-executable instructions to perform operations further comprising:
sending to the second other computing device an indication of authentication failure of the first other computing device in response to determining that the first transitory identity from the first other computing device does not match the first transitory identity from the second other computing device.

33. The computing device of claim 27, wherein the processor is configured with processor-executable instructions to perform operations further comprising:
determining that a duration of the first transitory identity has expired; and
sending an instruction to the first other computing device to obtain a new transitory identity in response determining that the duration of the first transitory identity has expired.

34. The computing device of claim 27, wherein the processor is configured with processor-executable instructions to perform operations further comprising:
determining that a duration of the second transitory identity has expired; and
sending an instruction to the second other computing device to obtain a new transitory identity in response determining that the duration of the second transitory identity has expired.

35. The computing device of claim 27, wherein the processor is configured with processor-executable instructions to perform operations further comprising:

receiving from an electronic security system an indication of an unauthorized user; and
sending an instruction to one or more of the first other computing device and the second computing device to obtain an ephemeral new transitory identity in response to the indication of the unauthorized user.

36. The computing device of claim 27, wherein the processor is configured with processor-executable instructions to perform operations further comprising:
receiving from the first other computing device an encrypted text string and decrypting the encrypted text string;
re-encrypting the decrypted text string and sending the re-encrypted text string to the second other computing device;
receiving an indication from the second other computing device of whether a participation of the first other computing device is authenticated; and
storing the indication of whether the participation of the first other computing device is authenticated.

37. A method of authenticating interactions between a first computing device and a second computing device with support of a third computing device, the method comprising:
obtaining an ephemeral first transitory identity at the first computing device;
sending the first transitory identity to the second computing device and to the third computing device;
receiving in the second computing device the first transitory identity from the first computing device;
obtaining an ephemeral second transitory identity at the second computing device;
sending the second transitory identity from the second computing device to the first computing device and to the third computing device;
receiving in the first computing device the second transitory identity from the second computing device;
sending a first authentication query including the second transitory identity from the first computing device to the third computing device;
sending a second authentication query including the first transitory identity from the second computing to the third computing device;
receiving in the third computing device the first transitory identity from the first computing device;
receiving in the third computing device the second authentication query;
determining in the third computing device whether the first transitory identity from the first computing device matches the first transitory identity from the second computing device;
sending by the third computing device to the second computing device an indication of whether the first computing device is authenticated based on the determination of whether the first transitory identity from the first computing device matches the first transitory identity from the second computing device;
receiving in the third computing device the second transitory identity from the second computing device;
receiving in the third computing device the first authentication query;
determining by the third computing device whether the second transitory identity from the first computing device matches the second transitory identity from the second computing device;
sending by the third computing device to the first computing device an indication of whether the second computing device is authenticated based on the determination of whether the second transitory identity from the first computing device matches the second transitory identity from the second computing device;

receiving in the first computing device from the third computing device an indication of whether the second computing device is authenticated; and receiving in the second computing device from the third computing device an indication of whether the first computing device is authenticated.

* * * * *